United States Patent [19]

Kimura et al.

[11] Patent Number: 5,198,475
[45] Date of Patent: Mar. 30, 1993

[54] POLYOL AND UTILIZATION THEREOF

[75] Inventors: Masayuki Kimura, Kanagawa; Satoshi Ozaki, Aichi; Tsukuru Izukawa, Aichi; Haruhiko Kawakami, Aichi; Takayoshi Masuda, Aichi; Mitsugu Kita, Aichi, all of Japan

[73] Assignee: Mitsui Toatsu Chemicals, Inc., Tokyo, Japan

[21] Appl. No.: 606,617

[22] Filed: Oct. 31, 1990

[51] Int. Cl.$^5$ .................... C08G 8/28; C08G 18/12; C08L 61/06

[52] U.S. Cl. ............................ 52/164; 521/171; 521/173; 521/174; 521/180; 521/181; 521/185; 525/504; 528/77; 528/78; 528/79; 252/182.25

[58] Field of Search ............... 521/164, 180, 185, 171, 521/173, 174, 181; 528/86, 77, 78, 79; 525/504; 252/182.25

[56] References Cited

U.S. PATENT DOCUMENTS

| | | | |
|---|---|---|---|
| 3,490,009 | 3/1970 | Odinak et al. | 365/137 |
| 4,107,106 | 8/1978 | Dunleavy et al. | 521/164 |
| 4,195,151 | 3/1980 | Dunleavy et al. | 521/164 |
| 4,247,655 | 1/1981 | Dunleavy et al. | 521/164 |
| 4,324,716 | 4/1982 | Reischl et al. | 521/164 |
| 4,607,064 | 8/1986 | Kuhn et al. | 521/914 |
| 4,710,521 | 12/1987 | Soukup et al. | 521/164 |
| 4,769,437 | 9/1988 | Blount et al. | 521/180 |
| 4,789,690 | 12/1988 | Milovanovic-Lerik et al. | 521/173 |

FOREIGN PATENT DOCUMENTS

| | | |
|---|---|---|
| 51-105394 | 9/1976 | Japan . |
| 57-151613 | 9/1982 | Japan . |
| 57-151614 | 9/1982 | Japan . |
| 934629 | 8/1963 | United Kingdom . |

OTHER PUBLICATIONS

Chemical Abstracts, "Thermally stable polyurethane resins", Sep. 1984, vol. 101, No. 12, p. 40.
Asano et al, Chemical Abstracts, "Polyol compositions for rigid polyurethane foams", Feb. 1986, vol. 104, No. 6, p. 38.

*Primary Examiner*—John Kight, III
*Assistant Examiner*—John M. Cooney, Jr.
*Attorney, Agent, or Firm*—Burns, Doane, Swecker & Mathis

[57] ABSTRACT

A polyurethane resin, rigid polyurethane foam and composite thereof prepared by using a polyol comprising a phenol resin base polyol mixed with an aminophenol base polyol or a polyphenylpolyxylylenepolyamine base polyol or a polymethylenepolyphenylpolyamine base polyol.

46 Claims, No Drawings

POLYOL AND UTILIZATION THEREOF

BACKGROUND OF THE INVENTION

(a) Field of the Invention

The present invention relates to a polyol, polyurethane resin, rigid polyurethane foam, preparation process thereof and a composite of said rigid polyurethane foam.

More particularly, the polyol used in the present invention, which is a phenyl resin based polyol mixed with an aminophenol based polyol or polyphenylpolyxylylenepolyamine based polyol or polymethylenepolyphenylpolyamine based polyol is a raw material for preparing polyurethane resins resistant to dissolving in hydrochlorofluorocarbons (hereinafter abbreviated as HCFC) and hydrofluorocarbons (hereinafter abbreviated as HFC) which are foaming agents of very low public hazards. The polyol can provide rigid a polyurethane foam and its composite by using the above foaming agents The rigid polyurethane foam according to the invention has particularly excellent properties as they are equivalent to those of conventional polyurethane foams obtained by the use of chlorofluorocarbons (hereinafter abbreviated as CFC) as foaming agents. Hence, the rigid polyurethane foam of the present invention is extremely useful for the insulating materials or the insulating structural materials of electric refrigerators, freezing warehouses, insulation panels, ships and vehicles.

(b) Description of the Prior Art

Rigid polyurethane foam has excellent heat insulation properties and low temperature dimensional stability, and thus, various composites prepared therefrom are widely used for refrigerators, freezing ware houses, building wall faces, ceilings, heat insulation and structural materials for ships and vehicles, and the heat insulating and protective covers of instruments.

Further, large numbers of composites containing the rigid polyurethane foam formed on a sheet of face material or in a cavity surrounded by a plurality of face materials have already been manufactured by a batch process or a continuous process.

In the present manufacturing process of polyurethane foams, CFC such as CFC-11 and CFC-12 are generally used as foaming agents. These compounds have recently been recognized as materials which cause environmental destruction such as the disruption of the ozone layer or enhancement of the green house effect. Accordingly, restrictions have recently been imposed upon the manufacture and use of these compounds.

At the same time, attention has been focused on HCFC such as 2,2-dichloro-1,1,1-(trifluoroethane (HCFC-123), 1,1-dichloro-1-fluoroethane (HCFC-141b) 1-chloro-1,1-difluoroethane (HCFC-142b), and 1-chloro-1,1-difluoromethane (HCFC-22), and additionally, HFC such as 1,1,1,2-tetrafluoroethane (HFC-134a) and 1,1-difluoroethane (HFC-152a), which cause much less environment destruction, as substitutes for CFC-11 and CFC-12. However, it has been found that HCFC and HFC have a higher dissolving power an polyurethane resins compared with CFC, and hence have the disadvantage of severely deteriorating the properties of resulting polyurethane foams. For example, they reduce closed cell content and foam strength. Particularly it has been found by the present inventors that in the manufacture of rigid polyurethane foams, HCFC and HFC dissolve the cell walls of closed cells in the course of foaming and drastically lower heat insulation effects which is a characteristic property of rigid polyurethane foams.

Consequently, there is a great desire for a novel polyurethane resin which avoids the above problems. The conventional polyoxyalkylene polyol used as a raw material in the production of polyurethane resin exhibits a viscosity decrease with an increase in the amount of alkylene oxide added.

As a result, operations in polyurethane foam production can be conducted with ease. It has been found that an excess addition of alkylene oxide leads to a dissolution of polyurethane resin into HCFC and HFC, and tends to make application of these foaming agents substantially impossible. On the other hand, when the amount of alkylene oxide added is reduced, it has been discovered that a resistance to dissoling in HCFC and HFC is improved slightly, but the polyol becomes solid or extremely viscous and solubility between each raw material decreases. As a result, it is very difficult to handle, and a satisfactory product cannot be obtained.

Particularly in the production of rigid polyurethane foam, viscosity of the polyol and solubility between the polyol, foaming agent and organic polyisocyanate are necessary. Unfortunately, a polyol which has a viscosity suitable for foaming and provides excellent mixing and dispersing ability in HCFC and HFC has never been found.

Japanese TOKKAI-SHO 57-151613(1982) and TOKKAI-SHO 57-151614(1982) disclose methods of blending low molecular weight polyol in order to decrease the viscosity of mixtures of amine based polyols and aromatic based polyester polyols (alkylene oxide was not added).

TOKKAI-Sho 51-105394 (1976) discloses a mixed polyol having a hydroxyl value of 200~500 mgKOH/g comprising a novolak based polyol, aromatic amine based polyol and an aliphatic polyol. TOKKAI-Sho 63-264616 and TOKKAI-Hei 1-135824 disclose mixed polyols comprising novolak resin based polyols having hydroxyl values of 50~350 mgKOH/g, polyetherpolyols and/or polyesterpolyols. But they do not disclose the polyols of the present invention and the rigid polyurethane foam produced from the polyol and HCFC or HFC.

SUMMARY OF THE INVENTION

The present invention relates to a polyol, polyurethane resin, rigid polyurethane foam, preparation process therefor and a preparation process of a rigid polyurethane foam composite.

The polyol used in the present invention comprises a phenol resin based polyol mixed with an aminophenol based polyol or a polyphenylpolyxylylenepolyamine based polyol or a polymethylenepolyphenylpolyamine based polyol.

The above polyurethane resin, foam and composite have a resistance to dissolution in hydrochlorofluorocarbons and hydrofluorocarbons, and are foaming agents which exhibit very low public hazard.

The above-mentioned foams have excellent physical properties equivalent to those of conventional polyurethane foams obtained by using chlorofluorocarbons, and hence are very useful as a thermal insulation material or a thermal insulation structure for refrigerators, freezers, insulation panels, ships or vehicles.

DETAILED DESCRIPTION OF THE INVENTION

The primary object of the present invention is, particularly in the production of a rigid polyurethane foam, to provide a polyol which gives equivalent operation efficiency in polyurethane foaming operation and equivalent resultant foam properties to conventional CFC, even though HCFC and/or HFC having very low hazards are used.

As a result of an intensive investigation in order to achieve the above object, the present inventors have completed the present invention.

That is, the aspect of the present invention is illustrated by the following (1) to (6).

(1) Polyol(D) comprising phenol resin based polyol(A) and aminophenol based polyol (B) in a ratio (A)/(B) of from 0.25 to 4.0 by weight, said polyol (D) having a hydroxyl value of from 180 to 700 mgKOH/g.

(2) Poyol(E) comprising phenol resin based polyol(A) and polyphenylpolyxylylenepolyamine base polyol(C) in a (A)/(C) ratio of from 0.25 to 4.0 by weight, said polyol(E) having a hydroxyl value of from 180 to 700 mgKOH.g.

(3) A polyurethane resin obtained by the reaction of a polyol with an organic polyisocyanate wherein a portion or the whole of said polyol is the polyol(D) described in (1) or the polyol(E) described in (2).

(4) A rigid polyurethane foam obtained by the reaction of an organic polyisocyanate with a resin premix comprising a polyol, foaming agent, catalyst, cell regulator and other additives, said polyol comprising the polyol(D) described in (1), the polyol(E) described in (2), or a polyol (G) comprising a phenol resin based polyol (A) and polyphenylpolymethylenepolyamine based polyol(F), said foaming agent comprising a compound or a mixture thereof selected from the group consisting of a HCFC and HFC, said foaming agent additionally comprising an auxiliary foaming agent, if desired.

(5) A preparation process of the rigid polyurethane foam described in (4).

(6) A preparation process of a rigid polyurethane foam composite by reacting an organic polyisocyanate with a resin premix comprising a polyol, foaming agent, catalyst, cell regulator and other additives to form a rigid polyurethane foam on a face material or in a cavity surrounded by a plurality of face materials, said polyol comprising polyol(D) described in (1), polyol(E) described in (2), or a polyol (G) comprising phenol resin based polyol (A) and polyphenylpolymethylenepolyamine base polyol(F), said foaming agent comprising a compound or a mixture thereof selected from the group consisting of a HCFC and a HFC, said foaming agent additionally comprising an auxiliary foaming agent, if desired.

The polyol for use in the present invention is the above polyol(D), polyol(E) and polyol(G).

Polyol(D) used in the present invention comprises as one component, phenol resin based polyol (A) and as another component, aminophenol based polyol (B).

Phenol resin based polyol(A) used in the invention comprises polyol(a) and polyol(b) or polyol (a) and polyol(c); said polyol(a) having a hydroxyl value of from 140 to 350 mgKOH/g and being prepared by the addition of from 1.0 to 4.5 moles of an alkylene oxide to one equivalent of hydroxyl of a phenol resin or a mixture thereof having a number average molecular weight (hereinafter abbreviated as (Mn)) of from 650 to 1400, an average functionality of from 3 to 8 and a structure of the formula (I):

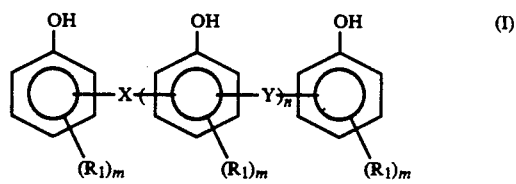

wherein $R_1$ is a hydrogen atom, alkyl having from 1 to 9 carbon atoms, halogen atom selected from chlorine, bromine and fluorine, or hydroxyl, m is an integer of from 1 to 3, n is an integer of from 1 to 6, and X and Y are same or different divalent group selected from the group consisting of an alkylene having from 1 to 10 carbon atoms, xylylene, oxy, thio and sulfonyl or bonded group of the above-mentioned groups; said polyol(b) having a hydroxyl value of 240 to 800 mgKOH/g and being obtained by adding from 0.5 to 3.0 moles of an alkylene oxide to one equivalent of active hydrogen in an alkanolamine series compound or a mixture thereof having the formula (II):

$$NR_2R_3 \qquad (II)$$

wherein $R_2$ and $R_3$ are respectively a hydrogen atom, hydroxyethyl or hydroxyisopropyl, $R_2$ and $R_3$ are same or different and excluding the case wherein both $R_2$ and $R_3$ are hydrogen atoms; said polyol(c) having a hydroxyl value of 130 to 750 mgKOH/g and being obtained by the addition of from 0.8 to 6.5 moles of an alkylene oxide to one equivalent of hydroxyl in an active hydrogen containing compound which is an aliphatic polyhydroxy compound having functionality of from 2 to 8 or a mixture thereof.

The suitable phenol resin for use in the invention includes, for example, reaction products of phenols such as phenol, cresol, butylphenol, nonylphenol, chlorophenol, resorcinol, hydroquinone, catechol, guaiacol, bisphenol A or bisphenol S with aldehydes such as formaldehyde or acetaldehyde, α,α'-dimethoxyxylene, α, α'-dichloroxylene or sulfur. The reaction is carried out by known methods.

The preferred phenol resin is a novolak resin which has the formula (I) wherein $R_1$ is a hydrogen atom and both X and Y are methylene, and has (Mn) of 650 to 900, average functionality of 3 to 8, and a softening point of 75° to 120° C.

The alkylene oxide used for the present invention includes, for example ethylene oxide, propylene oxide and butylene oxide. The alkylene oxide may be used singly or in combination.

It was found that when mole numbers of alkylene oxide addition are increased, solubility resistance to HCFC or HFC is generally decreased.

When (Mn) of the phenol resin is less than 650, any of the polyurethane resins derived from the reaction with organic polyisocyanate have a tendency to dissolve in HCFC and HFC.

On the other hand, (Mn) of the phenol resin exceeding 1400 leads to high viscosity in any mixing ratio, poor dispersibility in HCFC and HFC, inferior operation efficiency in reaction, with organic polyisocyanate.

The suitable polyol (a) for use in the invention is obtained by the addition of 1.0 to 4.5 moles of alkylene oxide to 1 equivalent of the hydroxyl group in the phenol resin. Alkylene oxide of less than 1.0 mole, that is, a large amount of remaining phenolic hydroxyl group, causes unfavorable reduction of physical properties in the resulting polyurethane foam. On the other hand, an alkylene oxide addition exceeding 4.5 mole eliminates resistance to HCFC or HFC of the resulting polyurethane resin, although viscosity is reduced and dispersibility in HCFC and HFC becomes better.

When the phenol resin has an average functionality of less than 3, the resulting polyurethane resin made from (a) and (b) or (a) and (c) decreases resistance to HCFC and HFC. On the other hand, an average functionality exceeding 8 leads to a disadvange of rendering the polyurethane resin brittle.

The alkanolamine for use in the invention includes, for example, monoethanolamine, diethanolamine, triethanolamine, monoisopropanolamine, diisopropanolamine and triisopropanolamine.

The suitable polyol (b) used in the invention is obtained by the addition of 0.5 to 3.0 moles of alkylene oxide to 1 equivalent of active hydrogen in the alkanolamine.

When the amount of alkylene oxide is less than 0.5 mole per equivalent of active hydrogen of alkanolamine, crosslinking activity of alkanolamine remains, and hence, deteriorates physical properties of the resulting polyurethane foam. An amount of alkylene oxide exceeding 3.0 moles also decreasses foam properties and the resulting polyurethane foam cannot be used practically.

The polyols (a) and (b) used in the invention are preferably used in a mixing ratio (a)/(b) of 0.25 to 4.0 by weight. A mixing ratio exceeding 4.0 causes high viscosity and poor dispersibility and dissolving in HCFC and HFC, and also leads to unfavorable operation problems in the preparation of a polyurethane resin. On the other hand, a mixing ratio less than 0.25 is unsuitable because of inferior properties of resulting polyurethane foams and a deterioration of resistance to dissolving in HCFC or HFC.

The suitable aliphatic polyhydroxy compounds used for the present invention are a single compound or a mixture of two or more compounds selected from the group consisting of a glycols, polyhydric alcohols and a polysaccharides having 2 to 8 functionality. Exemplary aliphatic polyhydroxy compounds include glycols such as ethylene glycol, diethylene glycol, propylene glycol, dipropylene glycol, butanediol, neopentyl glycol, cyclohexane dimethanol and cyclohexane tetramethanol; polyhydric alcohols such as glycerol, trimethylolethane, trimethylolpropane, and pentaerythritol; and polysaccharides such as methylglucoside, sorbitol, mannitol, dulcitol and sucrose.

Preferred mole numbers of alkylene oxide addition are from 0.5 to 6.5 moles per equivalent of the hydroxyl in the aliphatic polyhydroxy compound. An alkylene oxide addition of less than 0.5 mole makes the resultant polyurethane foam brittle. On the other hand, an addition exceeding 6.5 moles lowers resistance to HCFC and HFC of the polyurethane resin obtained.

The polyols (a) and (c) which are intiated with the phenol resin and aliphatic polyhydroxy compound, respectivley, are preferably mixed in the ratio (a)/(c) of 0.1 to 4.0 by weight. A mixing ratio less than 0.1 reduces resistance to HCFC or HFC of polyurethane resin prepared by reacting in the presence of a catalyst. On the other hand, a mixing ratio exceeding 4.0 leads to a disadvantage of poor operation efficiency due to too high viscosity in the preparation of polyurethane resin.

Aminophenol based polyol (B) comprises polyol(d) having a hydroxyl value of from 150 to 700 mgKOH/g and polyol(b) or polyol (d) and polyol(c) described in the phenol resin base polyol (A), said polyol(d) being obtained by adding from 1.0 to 9.0 moles of an alkylene oxide to one equivalent of active hydrogen in an aminophenol series compounds or a mixture thereof having a (Mn) of from 100 to 200, average functionality of from 3 to 6, and a structure of the formula (III):

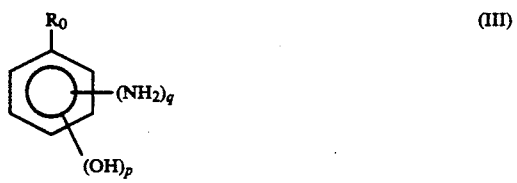

wherein $R_0$ is a hydrogen atom, aliphatic hydrocarbon group having from 1 to 5 carbon atoms, or alicyclic hydrocarbon, q is an integer of from 1 to 2, and p is an integer of from 1 to 2.

Exemplary suitable aminophenol compounds include aminophenol, aminocresol, aminoethylphenol, aminobutylphenol, aminoresorcinol, aminopyrocatechol, aminohydroquinone, aminohomocatechol, aminocresorcinol, aminoorcinol, diaminophenol, diaminocaresol.

Aminophenol based polyol(B) comprises polyol(d) and polyol(b) or polyol (d) and polyol(c) in a (d)/(b) ratio of from 0.25 to 4.0 by weight and a (d)/(c) ratio of from 0.1 to 4.0 by weight. The reason for the selection Of these mixing ratios is the same as (a)/(b) and (a)/(c) in the case of phenol resin based polyol(A).

Polyol(D) comprises phenol resin based polyol(A) and aminophenol based polyol(B) in a (A)/(B) retio of from 0.25 to 4.0 by weight and has a hydroxyl value of from 180 to 700 mgKOH/g.

Even though polyol(A) is used singly, the rigid polyurethane foam obtained by using HCFC and/or HFC as foaming agents exhibits relatively good physical properties. When polyol(A) is used in combination with polyol(B), foam properties such as heat conductivity, compressive strength, and low temperature dimensional stability can be further improved. A (A)/(B) ratio deviating from the range of from 0.25 to 4.0 leads to inferior properties of the foam.

Another polyol (E) of the present invention comprises as one component, afore-mentioned phenol resin based poplyol (A) and as another component, polyphenylpolyxylylenepolyamine based polyol (C).

Polyphenylpolyxylylenepolyamine based polyol(C) used in the present invention comprises a polyol(e) having a hydroxyl value of from 150 to 700 mgKOH/g and polyol(b) or polyol (b) and polyol(c) described above, said polyol(e) being obtained by adding from 1.0 to 9.0 moles of an alkylene oxide to one equivalent of active hydrogen in a polyphenylpolyxylylenepolyamine series compound or a mixture thereof having the formula (IV):

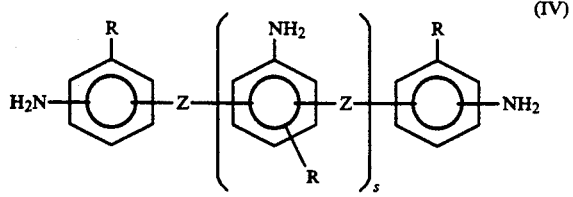

(IV)

wherein R is a hydrogen atom, aliphatic hydrocarbon group having 1 to 10 carbon atoms, or an alicyclic hydrocarbon group, Z is a xylylene group and s is an integer of from 0 to 10.

Above polyphenylpolyxylylenepolyamine series compound for use in the invention includes, for example, α, α′-bis (4-aminophenyl) xylene, polyphenylpolyxylylenepolyamine, mixture thereof derivatives, isomer and oligomer of these compounds.

When the amount of alkylene oxide is less than 1.0 mol per equivalent of the amino group, that is, many amino groups remain control of the foaming reaction becomes difficult and the resulting poloyurethane foam shows an unfavorable deterioration of physical properties. On the other hand, an alkylene oxide addition exceeding 9.0 moles leads to inferior physical properties, although viscosity is reduced and dispersing ability in HCFC and HFC becomes better.

The alkanolamine which can be used has been described above.

The polyol(b) used in the invention is obtained by the addition of 0.5 to 3.0 moles of alkylene oxide to 1 equivalent of active hydrogen in the alkanolamine.

When the amount of alkylene oxide is less than 0.5 mole per equivalent of active hydrogen of alkanolamine, crosslinking activity of alkanolamine remains and hence deteriorates physical properties of the resulting polyurethane foam. An amount of alkylene oxide exceeding 3.0 moles also decreases foam properties even in a polyol mixing ratio (e)/(b) of above 4.0 and the resulting polyurethane foam cannot be used practically.

The polyol (e) and (b) for use in the invention are preferably used in a mixing ratio (e)/(b) of 0.25 to 4.0 by weight. A mixing ratio exceeding 4.0 causes high viscosity and poor dispersibility in HCFC and HFC and also leads to unfavorable operation problems in the preparation of a polyurethane resin. On the other hand, a mixing ratio less than 0.25 is unsuitable because of inferior properties of the resulting polyurethane foams.

The aliphatic polyhydroxy compound which can be used has been described above.

The preferred amount of an alkylene oxide added to the aliphatic polyhydroxy compound is from 0.5 to 6.5 moles per equivalent of hydroxyl group in the aliphatic polyhydroxy compound. Addition of less than 0.5 mole makes resulting polyurethane foams brittle. On the other hand, an amount exceeding 6.5 moles decreases resistance of the resulting polyurethane resin to dissolution in HCFC and HFC. Polyphenylpolyxylylenepolyamine initiated polyol(e) and aliphatic polyhydroxy compound initiated polyol(c) are preferably mixed in a (e)/(c) ratio of from 0.1 to 4.0 by weight. A ratio less than 0.1 lowers resistance to dissolving in HCFC and HFC of polyurethane resin prepared in the presence of a catalyst. On the other hand, a ratio exceeding 4.0 causes too high of a viscosity of the resulting mixture and hence has a disadvantage of poor operation efficiency in the production of a polyurethane resin.

Polyol(E) is obtained by mixing polyol(A) and polyol(C) in a (A)/(C) ratio of from 0.25 to 4.0 by weight and has a hydroxyl value of from 180 to 700 mgKOH/g.

Although polyol(A) is used singly, the foam obtained by using HCFC and/or HFC as foaming agents exhibits relatively good physical properties. When polyol(A) is used in combination with polyol(C), much better results can be obtained on foam properties such as heat conductivity, compressive strength and dimensional stability. However, a ratio (A)/(C) deviating from the range of from 0.25 to 4.0 leads to inferior properties of the polyurethane foam obtained by using HCFC and/or HFC as foaming agents. Consequently, a preferred (A)/(C) ratio is in the range of from 0.25 to 4.0.

Polyol (G) used for preparing a rigid polyurethane foam and composite thereof according to the present invention comprises as one component, afore-mentioned phenol resin based polyol (A) and as another component, polymethylenepolyphenylpolyamine based polyol (F).

Polyol (F) comprises polyol(f) having hydroxyl value of 150~700 mgKOH/g, adding alkylene oxide of 1.0~9.0 mol per 1 equivalent of amino group in a polymethylenepolyphenypolyamine and aforementioned polyol (b) or polyol (f) and polyol (c).

It is preferable that the mixing ratio in weight of polyol (f) and polyol (b), i.e. (f)/(b) is 0.25~4.0, and that of polyol (f) and polyol (c), i.e. (f)/(c) is 0.1~4.0.

Polyol (G) is a mixture of polyol (A) and polyol (F) in which the mixing ratio in weight, i.e. (A)/(F) is 0.25~4.0, and hydroxyl value of the mixture is 180~700 mgKOH/g.

The relationship among mixing ratio of (f)/(b), (f)/(c) and (A)/(F), hydroxyl value of mixed polyols, physical properties of polyurethane, operation efficiency and effect of combination use of polyol (A) and polyol (F) is the same as that Of polyol (D) and polyol (E).

A suitable polymethylenepolyphenylpolyamine for use in the present invention includes, for example, polymethylenepolyphenylpolyamine, which is used commonly as a raw material of polymethylenepolyphenylpolyisocyanate, 4,4′-diaminodiphenylmethane which is separated from the polymethylenepolyphenylpolyamine, its isomer or a mixture of these isomers.

The catalyst which can be used in the present invention for the addition reaction of alkylene oxide to a single compound or mixture of phenol resin, alkanolamine series compound, aliphatic polyhydroxy compound, aminophenol series compound, polyphenylpoly xylylenepolyamine and polymethylenepolyphenylpolyamine as a starting materials, is an amine catalyst and an alkali metal hydroxide catalyst.

The amine catalyst is represented by the formula (V) or the formula (VI)

 (V)

 (VI)

wherein $R_4$ is a hydrogen atom or a group selected from a group consisting of alkyl having from 1 to 6 carbon atoms, hydroxyethyl and hydroxyisopropyl, $R_5$ is a hydrogen atom or a group selected from a group consisting of alkyl having from 1 to 4 carbon atoms hydroxyethyl and hydroxyisopropyl, t is an integer of from 1 6, but $R_4$ and $R_5$ cannot be hydrogen atoms at the same time in the formula (V).

An exemplary amine compound includes dibutylamine, ethylenediamine, tetramethylenediamine, monoethyanolamine, diethanolamine, triethanolamine, isopropanolamine, triethylamine, tri-n-propylamine, di-n-propylamine, n-propylamine, n-amylamine, N,N-dimethylethanolamine, isobutylamine, isoamylamine and methyldiethylamine.

Alkali metal hydroxide can also be used as the catalyst for the above addition reaction. Representative examples of alkali metal hydroxide include lithium hydroxide, sodium hydroxide, potassium hydroxide, magnesium hydroxide, calcium hydroxide and barium hydroxide.

The above amine and alkali metal hydroxide catalysts can be used singly or in combination.

The amount of the above catalysts used for the invention is from 0.1 to 2.0 parts by weight per 100 parts by weight of the sum of above starting materials having an active group such as amino group or active hydrogen. When an alkali metal hydroxide catalyst is used, reacted solution is neutralized by an acid solution such as phosphoric acid aqueous solution.

The polyol of the present invention can be prepared by charging in an autoclave, the catalyst and a single starting material or a mixture thereof selected from phenol resin, alkanolamine, aliphatic polyhydroxy compound aminophenol series compound, polyphenylpolyxylylenepolyamine series compound and polymethylenepolyphenylpolyamine and then gradually feeding an alkylene oxide to conduct an addition reaction. Preferred reaction temperature is 90° to 130° C. At a temperature of lower than 90° C. it is difficult to progress the reaction. On the other hand, a temperature exceeding 130° C. is liable to cause side reactions. When the above starting material is used singly, each polyol thus obtained can be subsequently blended in a prescribed amount.

The polyol in the present invention can be prepared by using a starting material singly or a mixture of it. In the case where the polyol prepared from the single material leads to a high viscosity and poor operation efficiency, it is preferred to prepare the polyol by using a mixture of the starting material corresponding to each component of the desired polyol.

In the examples of the invention, each polyol (a), (b), (c), (d), (e) or (f) is separately synthesized by using the starting material singly and followed by mixing these polyols to prepare component polyols (A), (B), (C), and (F). Thereafter, polyols (D), (E) and (G) of present invention are prepared by mixing the component polyols.

No particular restriction is imposed upon the organic polyisocyanate for use in the process of the invention.

Conventionally known organic polyisocyanates, for example, aromatic, aliphatic and alicyclic polyisocyanates and their modified products can be used. Exemplary polyisocyanates which are suitable for use include phenylendiisocyanate, diphenylmethane diisocyanate, crude diphenylmethane diisocyanate, tolylene diisocyanate, crude tolylene diisocyanate, xylylene diisocyanate, hexamethylene diisocyanate, isophorone diisocyanate, hydrogenated diphenylmethane diisocyanate, hydrogenated tolylene diisocyanate, triphenylmethane triisocyanate, tolylene triisocyanate, polymethylenepolyphenylpolyisocyanate, modified polyisocyanates such as carbodiimide modified diphenylmethane diisocyanate, and isocyanate terminated prepolymers which can be obtained by reacting the above polyisocyanate with the low molecular polyol or polymer polyol in a NCO/active hydrogen equivalent ratio of from 2 to 20 and have an isocyanate content of from 5 to 35% by weight.

These polyisocyanates can be used singly or in combination.

The equivalent ratio of the polyisocyanate to the hydroxyl group in the resin premix is in the range of from 0.8 to 5.0. An equivalent ratio exceeding 5.0 leads to unreacted remaining polyisocyanate. On the other hand, an equivalent ratio less than 0.8 results in unreacted remaining polyol. Hence the above range is preferable.

The foaming agent for use in the invention is HCFC and HFC.

Exemplary HCFC include 2,2-dichloro-1,1,1-trifluoroethane (HCFC-123), 1,1-dichloro-1-fluoroethane (HCFC-141b) 1-chloro-1, 1-difluoroethane (HCFC-142b) and monochlorodifluoromethane (HCFC-22). Representative HFC includes 1,1,1,2-tetrafluoroethane (HFC-134a) and 1,1-difluoroethane (HFC-152a). These foaming agents can be used singly or in combination.

When necessary, water and/or low boiling point compound and other auxiliary foaming agents can be used in combination.

Water is usually used in an amount of from 0.5 to 5.0 parts by weight per 100 parts by weight of the resin premix. Exemplary low boiling point compounds include methylene chloride and other low boiling point hydrocarbons (boiling point is from 10° to 50° C.) and their mixture. Conventional CFC can also be used in combination.

The foaming catalyst which can be used for the rigid polyurethane foam, preparation of the invention includes, for example, amine catalysts such as triethylamine, tripropylamine, triisopropanolamine, tributylamine, trioctylamine, hexadecyldimethylamine, N-methylmorpholine, N-ethylmorpholine, N-octadecylmorpholine, monoethanolamine, diethanolamine, triethanolamine, N-methyldiethanolamine, N,N-dimethylethanolamine, diethylenetriamine, N,N,N',N'-tetramethylethylenediamine, N,N,N',N'-tetramethylpropylenediamine, N,N,N',N'-tetramethylbutanediamine, N,N,N',N'-tetramethyl-1,3-butanediamine, N,N,N',N'-tetra-methylhexamethylenediamine, bis [2 (N,N-dimethylamino)ethyl] ether, N,N-dimethylbenzylamine, N,N-dimethylcyclohexylamine, N,N,N',N'', N''-pentamethyldiethylenetriamine, triethylenediamine, formic acid and other acid salts of triethylenediamine, oxyalkylene adducts of primary and secondary amines, aza ring compounds such as N,N'-dialkylpiperazine, and various N,N',N''-trialkylaminoal kylhexahydrotriazines such as β-aminocarbonyl catalyst disclosed in Japanese TOKKO SHO 52-043517 (1977) and β-aminonitrile catalyst disclosed in Japanese TOKKO SHO 53-014279 (1978); and organometallic catalysts such as tin acetate, stannous octoate, stannous oleate, stannous laurate, dibutyltin diacetate, dibutyltin dilaurate, dibutyltin dichloride, lead octoate, lead naphthenate, nickel naphthenate and cobalt naphthenate.

These catalyst can be used singly or in combination. The amount of the catalyst for use is in the range of from 0.0001 to 10.0 parts by weight per 100 parts of the polyol.

The cell regulator for use in the present invention is a conventionally known organic silicone surfactant. Exemplary foam regulators include products of Nippon Unicar Co., Ltd. which are L-520, L-540, L-5340, L-5410, L-5420, L-5710 and -5720, products of Toray Silicone Co., Ltd. which are SH-190, SH-192, SH-193, SH-194, and SH 195, products of Shinetsu Silicone Co., Ltd. which are F-305, F-306, F-317, F-341 and F-345, and a product of Toshiba Silicone Co., Ltd. which is TFA-4200.

The amount Of the cell regulator used is in the range of from 0.1 to 20 parts by weight per 100 parts by weight of the sum of the polyol and the organic polyisocyanate.

Flame retardants which can be used are tris(2-chloroethyl) phosphate, tris(dichloropropyl) phosphate, tris(dibromopropyl) phosphate, products of Daihachi Chemical Co., Ltd. which are CR-505 and CR-507, and a product of Akzo Japan Co., Ltd. which is Fyrol-6.

Other additives usually employed in polyurethanes, for example, plasticizers, fillers, stabilizers, such as antioxidants, ultraviolet absorbers and colorants can also be added, if necessary.

In the case of preparing the polyurethane resin, the polyol, catalyst, stabilizer, organic polyisocyanate and other additives are mixed rapidly according to the formulation and poured into a mold, then are cured in room temperature. In the case of preparing the rigid polyurethane foam, the polyol, catalyst, cell regulator, flame retardant afore-mentioned foaming agent and other additives are mixed in a prescribed amount to foam a premix. Said polyol is that containing afore-mentioned polyol (D) or polyol (E) or polyol (G).

Using a polyurethane dispensing machine, the resin premix is rapidly and continuously mixed with the organic polyisocyanate at a constant ratio so as to obtain a NCO/active hyfrogen equivalent ratio of from 0.8 to 5.0.

The mixture obtained is successively poured into a cavity or a mold. After pouring, liquid raw material of the rigid polyurethane foam is formed and cured in several minutes.

The rigid polyurethane foam obtained in the present invention is used for the heat-insulation material or structural material of refrigerators, heat-insulating panels, ships and vehicles.

EXAMPLE

The present invention will hereinafter be illustrated further in detail by way of examples and comparative examples.

POLYOL PREPARATION

Reference Example 1

To a 2l autoclave, 500 g of novolak resin #2000, a product of Mitsui Toatsu Chemicals, Inc. illustrated in Table 1, was charged. The internal atmosphere of the autoclave was replaced with nitrogen. The autoclave was then heated to 120° C., 2.3 g of triethylamine was added, and successively 274 g of propylene oxide was gradually charged. After reacting for 3 hours unreacted propylene oxide was removed from the reaction system. Polyol (a-1) thus obtained was 720 g and had a hydroxyl value of 339 mgKOH/g.

Reference Example 2~9

Polyols (a-2~a-9) indicated in Table 2 were prepared by carrying out the same procedure as described in Reference Example 1, excepting the change of raw material formulation as indicated in Table 2. Hydroxyl values of polyols prepared were indicated in Table 2.

Reference Example 10~18

Polyols (b-1~b-7, c-1 and c-2) indicated in Table 3 were prepared by carrying out the same procedure as described in Reference Example 1, excepting the change of phenol resin in Reference Example 1 with triethanolamine, glycerol, sucrose or trimethyrolpropane in Reference Examples 10~18, and the change of raw material formulation as indicated in Table 3.

Hydroxyl values of these polyols were indicated in Table 3.

Preparation of phenol resin base polyol (A)

Reference Examples 19~27

Polyol (A-1~A-9) was prepared by using the polyol (a), (b) and(c) prepared in Reference Examples 1~9 in Table 2 and Reference Examples 10~18 in Table 3.

Phenol resin base polyol (A-1~A-9) were prepared by the formulation indicated in Table 4. Hydroxyl values and viscosity values of these polyols were indicated in Table 4.

Reference Example 28~32

Polyols (d-1~d-5)indicated in Table 5 were prepared by carrying out the same procedure as discribed in Reference Example 1 excepting the change of phenol resin in Reference Example 1 with p-aminophenol and the change of raw material formulation as indicated in Table 5.

Hydroxyl values of these polyols were indicated in Table 5.

Reference Examples 33~37

Polyols (b-8~b-10, c-3 and c-4) indicated in Table 6 were prepared by carrying out the same procedure as described in Reference Example 1 excepting the change of phenol resin in Reference Example 1 with triethanolamine or glycerol and the change of raw material formulation as indicated in Table 6. Hydroxyl values of these polyols were indicated in Table 6.

Preparation of aminophenol base polyol (B)

Reference Examples 38~42

Aminophenol base polyols (B-1~B-5) were prepared by using the polyol (d), (b) and (c) prepared in Reference Examples 28 .32 in Table 5 and Reference Examples 33 37 in Table 6. Aminophenol base polyoles (B-1~B-5) were prepared by the formulation indicated in Table 7. Hydroxyl values of these polyols were indicated in Table 7.

Reference Example 43~48

Polyols (e-1~e-6) indicated in Table 8 were prepared by carrying out the procedure as described in Reference Example 1 excepting the change of phenol resin in Reference Example 1 with polyphenylpolyxylylenepolyamine, and the change of raw material formulation as indicated in Table 8.

Hydroxyl values of these polyols were indicated in Table 8.

Reference Example 49~54

Polyols (b-11~b-13 and c-5~c-7) indicated in Table 9 were prepared by carrying out the procedure as described in Reference Example 1 excepting the change of phenol resin in Reference Example 1 with triethanolamine or glycerol, and the change of raw material formulation as indicated in Table 9.

Hydroxyl values of these polyols were indicated in Table 9.

Preparation of polyphenylpolyxylylenepolyamine base polyol (C)

Reference Example 55~60

Polyphenylpolyxylylenopolyamine base polyols (C-1~C-6) were prepared by using the polyol (e), (b) and (c) prepared in Reference Examples 43~48 in Table 8 and Reference Examples 49~54 in Table 9, according to the formulation indicated in Table 10. Hydroxyl values and viscosity values of these polyols were indicated in Table 10.

Examples 1~11

Polyol (D) and (E) indicated in Examples 1~11 were prepared according to the formulation indicated in Table 11 by using phenol resin base polyols (A-1~A-9) indicated in Table 4, aminophenol base polyols (B-1~B-5) indicated in Table 7 and polyphenylpolyxylylenepolyamine base polyols (C-1~C-6) indicated in Table 10.

Hydroxyl values and viscosity values of these polyols abtained indicated in Table 11.

Preparation of Polymethylenepolyphenylpolyamine Base Polyol. (F)

Example 61~66 in Reference Example 1, excepting the change of phenol resin in Reference Example 1 with polymethylenepolyphenylpolyamine. Hydroxyl values of these polyols were indicated in Table 12.

Reference Example 67~72

Polyols (b-14, b-15 and c-8~c-11) indicated in Table 13 were prepared by carrying out the same procedure as described in reference Example 1, excepting the change of phenol resin in Reference Example 1, with triethanolamine, glycerol or pentaerythritol, and the change of raw material formulation as indicated in Table 13. Hydroxyl values of these polyol were indicated in Table 13.

Reference Example 73~78

Polymethylenepolyphenylpolyamine base polyols (F) were prepared by using the polyols (f), (b) and (c) prepared in Reference Examples 61~66 indicated in Table 12 and Reference Examples 67~72 in Table 13, according to the formulation indicated in Table 14. Hydroxyl values and viscosity values of polyols thus obtained were indicated in Table 14.

Reference Examples 79~84

Polyols (G-1~G-6) indicated in Table 15 were prepared according to the formulation indicated in Table 15 by using phenol resin base polyol (A-1~A-3, A-5, A-6 and A-9) indicated in Table 4 and polymethylenepolyphenylpolyamin base polyols (F-1~F-6). Hydroxyl values and viscosity values of these polyols obtained were indicated in Table 15.

TABLE 1

| | Physical Properties of Novolak Resin and Phenol Base Resin | | | |
|---|---|---|---|---|
| No. | Grade (#) (Product of MITSUI TOATSU CHEMICALS, INC.) | Number average molecular weight (Mn) | Average functionality | Softening point (°C.) |
| (1) | 1000 HS | 867 | 7.70 | 115 |
| (2) | 2000 | 723 | 6.37 | 95 |
| (3) | 9000 | 654 | 5.62 | 93 |
| (4) | Cresol/Novolak type | 815 | 6.71 | 103 |
| (5) | Bisphenol A/Nonylphenol type | 1032 | 5.18 | 121 |

TABLE 2

| Reference Example No. | 1 | 2 | 3 | 4 | 5 | 6 | 7 | 8 | 9 |
|---|---|---|---|---|---|---|---|---|---|
| Polyol (a) | a-1 | a-2 | a-3 | a-4 | a-5 | a-6 | a-7 | a-8 | a-9 |
| Phenol resin (No.: Table 1) (g) | 500 (2) | 500 (3) | 500 (2) | 500 (4) | 500 (5) | 500 (1) | 500 (2) | 500 (2) | 500 (3) |
| Propylene oxide (g) | 274 | 547 | | 305 | 320 | 1231 | 821 | 300 | 547 |
| Ethylene oxide (g) | | | 537 | | | | | | |
| Alkylene oxide addition amount (mol/OH Eq.) | 1.0 | 1.9 | 2.8 | 1.2 | 1.9 | 4.4 | 3.1 | 1.1 | 1.9 |
| OH-value (mg KOH/g) | 339 | 250 | 204 | 295 | 182 | 153 | 198 | 320 | 250 |

Note:
Eq: Equivalent
OH-value: Hydroxyl value (JIS K 1557)

Polyols (f-1~f-6) indicated in Table 12 were prepared by carring out the same procedure as descrbled

TABLE 3

| Reference Example No. | 10 | 11 | 12 | 13 | 14 | 15 | 16 | 17 | 18 |
|---|---|---|---|---|---|---|---|---|---|
| Polyol (b) or (c) | b-1 | b-2 | b-3 | b-4 | b-5 | b-6 | b-7 | c-1 | c-2 |
| Triethanolamine (g) | 500 | 500 | 500 | 500 | 550 | 550 | 250 | | |
| Glycerol (g) | | | | | | | | 500 | |
| Trimethylolpropane (g) | | | | | | | | | 500 |
| Sucrose (g) | | | | | | | 250 | | |
| Propylene oxide (g) | 821 | 1348 | | 821 | 706 | 1752 | 3530 | 832 | 4230 |
| Ethylene oxide (g) | | | 268 | | | | | | |
| Alkylene oxide addition amount (mol/OH Eq.) | 0.5 | 2.1 | 0.6 | 0.5 | 1.1 | 2.9 | 4.1 | 0.8 | 6.2 |
| OH-value (mg KOH/g) | 718 | 327 | 661 | 718 | 496 | 253 | 207 | 730 | 141 |

TABLE 4

| Reference Example No. | 19 | 20 | 21 | 22 | 23 | 24 | 25 | 26 | 27 |
|---|---|---|---|---|---|---|---|---|---|
| Mixed polyol (A) | A-1 | A-2 | A-3 | A-4 | A-5 | A-6 | A-7 | A-8 | A-9 |
| Polyol (a) | a-1 | a-2 | a-3 | a-4 | a-5 | a-6 | a-7 | a-8 | a-9 |
| Polyol (b) or (c) | b-1 | b-2 | b-3 | b-4 | b-5 | b-6 | b-7 | c-1 | c-2 |
| Mixing ration (a)/(b) or (a)/(c) (weight) | 1.0 | 0.43 | 1.0 | 1.0 | 0.67 | 1.5 | 1.0 | 1.5 | 3.0 |
| OH-value (mg KOH/g) | 532 | 298 | 465 | 507 | 370 | 193 | 460 | 245 | 240 |
| Viscosity (CP/25° C.) | 19700 | 9670 | 13000 | 19700 | 30300 | 18900 | 6300 | 4900 | 9750 |

Note:
OH-value: Hydroxyl value (JIS K 1557)
Viscosity: JIS K 1557
Eq.: Equivalent

TABLE 5

| Reference Example No. | 28 | 29 | 30 | 31 | 32 |
|---|---|---|---|---|---|
| Polyol (d) | d-1 | d-2 | d-3 | d-4 | d-5 |
| P-Aminophenol (g) | 327 | 327 | 218 | 218 | 373 |
| Propylene oxide (g) | 522 | 1044 | 1044 | 1566 | |
| Ethylene oxide (g) | | | | | 792 |
| Alkylene oxide addition amount (mol/OH Eq.) | 1.0 | 2.0 | 3.0 | 4.5 | 2.0 |
| OH-value (mg KOH/g) | 595 | 368 | 267 | 189 | 451 |

TABLE 6

| Reference Example No. | 33 | 34 | 35 | 36 | 37 |
|---|---|---|---|---|---|
| Polyol (b) or (c) | c-3 | c-4 | b-8 | b-9 | b-10 |
| Triethanolamine (g) | | | 745 | 745 | 298 |
| Glycerol (g) | 92 | 276 | | | 92 |
| Propylene oxide (g) | 1131 | 654 | 453 | 870 | 1044 |
| Ethylene oxide (g) | | | | | |
| Alkylene oxide addition amount (mol/OH Eq.) | 6.5 | 2.0 | 1.0 | 0.5 | 3.0 |
| OH-value (mg KOH/g) | 137 | 382 | 713 | 521 | 251 |

TABLE 7
Aminophenol Base Polyol (B)

| Reference Example No. | 38 | 39 | 40 | 41 | 42 |
|---|---|---|---|---|---|
| Mixed polyol (B) | B-1 | B-2 | B-3 | B-4 | B-5 |
| Polyol (d) | d-1 | d-2 | d-3 | d-4 | d-5 |
| Polyol (b) or (c) | c-3 | c-4 | b-8 | b-9 | b-10 |
| Mixing ratio (d)/(b) or (d)/(c) (weight) | 0.2 | 4.0 | 0.25 | 4.0 | 0.5 |
| OH-value (mg KOH/g) | 214 | 370 | 625 | 255 | 320 |
| Viscosity (CP/25° C.) | 700 | 7200 | 890 | 4800 | 3300 |

TABLE 8

| Reference Example No. | 43 | 44 | 45 | 46 | 47 | 48 |
|---|---|---|---|---|---|---|
| Polyol (e) | e-1 | e-2 | e-3 | e-4 | e-5 | e-6 |
| Polyphenylpolyxylylenepolyamine (g) | 895 | 895 | 448 | 895 | 448 | 895 |
| Propylene oxide (g) | 327 | 654 | 654 | 654 | 1473 | |
| Ethylene oxide (g) | | | | | | 497 |
| Alkylene oxide addition amount (mol/OH Eq.) | 1.0 | 2.0 | 4.0 | 2.0 | 9.0 | 2.0 |
| OH-value (mg KOH/g) | 518 | 408 | 287 | 408 | 164 | 455 |

Note:
Polyphenylpolyxylylenepolyamine: Anilix ®, a product of Mitsui Toatsu Chemicals, Inc.

(CP/25° C.)

TABLE 9

| Reference Example No. | 49 | 50 | 51 | 52 | 53 | 54 |
|---|---|---|---|---|---|---|
| Polyol (b) or (c) | c-5 | c-6 | b-11 | c-7 | b-12 | b-13 |
| Glycerol (g) | 92 | 460 | | 276 | | |
| Triethanolamine (g) | | | 1043 | | 1043 | 1043 |
| Propylene oxide (g) | 1131 | 696 | 609 | 1044 | 609 | 609 |
| Ethylene oxide (g) | | | | | | |
| Alkylene oxide addition amount (mol/OH Eq.) | 6.5 | 0.8 | 0.5 | 2.0 | 0.5 | 0.5 |
| OH-value (mg KOH/g) | 137 | 727 | 713 | 382 | 713 | 713 |

TABLE 10
Polyphenylpolyxylylenepolyamine Base Polyol (C)

| Reference Example No. | 55 | 56 | 57 | 58 | 59 | 60 |
|---|---|---|---|---|---|---|
| Mixed polyol (C) | C-1 | C-2 | C-3 | C-4 | C-5 | C-6 |
| Polyol (e) | e-1 | e-2 | e-3 | e-4 | e-5 | e-6 |
| Polyol (b) or (c) | c-5 | c-6 | b-11 | c-7 | b-12 | b-13 |
| Mixing ratio (e)/(b) or (e)/(c) (weight) | 4.0 | 2.0 | 0.25 | 0.10 | 0.5 | 3.0 |
| OH-value (mg KOH/g) | 441 | 514 | 628 | 384 | 536 | 519 |
| Viscosity | 22500 | 10700 | 3800 | 4200 | 7500 | 21500 |

TABLE 11

| Example No. | 1 | 2 | 3 | 4 | 5 | 6 | 7 | 8 | 9 | 10 | 11 |
|---|---|---|---|---|---|---|---|---|---|---|---|
| Polyol No. | D-1 | D-2 | D-3 | D-4 | D-5 | E-1 | E-2 | E-3 | E-4 | E-5 | E-6 |
| Polyol (A) | A-6 | A-2 | A-5 | A-3 | A-1 | A-6 | A-2 | A-5 | A-3 | A-1 | A-9 |
| Polyol (B) or (C) | B-1 | B-2 | B-3 | B-4 | B-5 | C-1 | C-2 | C-3 | C-4 | C-5 | C-6 |
| (A)/[(B) or (C)] (weight) | 0.25 | 2.0 | 4.0 | 0.5 | 4.0 | 4.0 | 2.0 | 0.25 | 3.0 | 1.0 | 0.33 |
| OH-value (mg KOH/g) | 210 | 320 | 420 | 325 | 490 | 243 | 370 | 577 | 445 | 535 | 450 |
| Viscosity (CP/25° C.) | 1300 | 8800 | 14000 | 7000 | 12000 | 20000 | 10200 | 5800 | 8200 | 12500 | 15800 |

*Polyol (D) and (E)*

TABLE 12

| Reference Example No. | 61 | 62 | 63 | 64 | 65 | 66 |
|---|---|---|---|---|---|---|
| Polyol (f) | f-1 | f-2 | f-3 | f-4 | f-5 | f-6 |
| Polymethylenepolyphenyl-polyamine (g) | 594 | 594 | 198 | 594 | 792 | 530 |
| Propylene oxide (g) | 696 | 696 | 1044 | 348 | 464 | |
| Ethylene oxide (g) | | | | | | 590 |
| Alkylene oxide addition amount (mol/OH Eq.) | 2.0 | 2.0 | 9.0 | 1.0 | 1.0 | 2.58 |
| OH-value (mg KOH/g) | 520 | 520 | 180 | 715 | 723 | 516 |

Note: Polymethylenepolyphenylpolyamine MDA-150, a product of Mitsui Toatsu Chemicals, Inc.

TABLE 13

| Reference Example No. | 67 | 68 | 69 | 70 | 71 | 72 |
|---|---|---|---|---|---|---|
| Polyol (b) or (c) | c-8 | c-9 | c-10 | c-11 | b-14 | b-15 |
| Glycerol (g) | 368 | 276 | 92 | | | |
| Pentaerythritol (g) | | | | 384 | | |
| Triethanolamine (g) | | | | | 596 | 596 |
| Propylene oxide (g) | 696 | 1566 | 1131 | 1392 | 348 | 696 |
| Ethylene oxide (g) | | | | | | |
| Alkylene oxide addition amount (mol/OH Eq.) | 1.0 | 3.0 | 6.5 | 3.0 | 0.5 | 1.0 |
| OH-value (mg KOH/g) | 630 | 274 | 140 | 253 | 723 | 525 |

TABLE 14

| Reference Example No. | 73 | 74 | 75 | 76 | 77 | 78 |
|---|---|---|---|---|---|---|
| Mixed polyol (F) | F-1 | F-2 | F-3 | F-4 | F-5 | F-6 |
| Polyol (f) | f-1 | f-2 | f-3 | f-4 | f-5 | f-6 |
| Polyol (b) or (c) | c-8 | c-9 | c-10 | c-11 | b-14 | b-15 |
| Ratio (f)/(b) or (f)/(c) (weight) | 4.0 | 3.0 | 0.1 | 1.0 | 4.0 | 1.0 |
| OH-value (mg KOH/g) | 540 | 460 | 144 | 404 | 720 | 521 |
| Viscosity (CP/25° C.) | 5000 | 16500 | 11200 | 22500 | 23000 | 19400 |

*Polymethylenepolyphenylpolyamine Base Polyol (F)*

TABLE 15

| Reference Example No. | 79 | 80 | 81 | 82 | 83 | 84 |
|---|---|---|---|---|---|---|
| Polyol No. | G-1 | G-2 | G-3 | G-4 | G-5 | G-6 |
| Polyol (A) | A-6 | A-2 | A-5 | A-3 | A-1 | A-9 |
| Polyol (F) | F-1 | F-2 | F-3 | F-4 | F-5 | F-6 |
| (A)/(F) (weight) | 4.0 | 0.67 | 0.25 | 1.0 | 0.25 | 3.0 |
| OH-value (mg KOH/g) | 262 | 395 | 190 | 475 | 685 | 310 |
| Viscosity (CP/25° C.) | 18000 | 13100 | 14000 | 21000 | 22500 | 12500 |

*Polyol (G)*

POLYURETHANE RESIN PREPARATION (EXAMPLES 12~22)

Polyurethane resin was prepared by reacting 30.0 g of a polyol obtained in examples or comparative examples, an organic polyisocyanate MDI-CR (a product of Mitsui Toatsu Chemicals, Inc.) having NCO content of 31.0%, and 0.10 g of amine catalyst Kaolizer No. 1 (Trademark, a product of Kao Co. Ltd.) at room temperature according to the formulation illustrated in Table 16.

CFC or HCFC absorption was measured on the polyurethane resin thus obtained. Results are illustrated in Table 16.

RIGID POLYURETHANE FOAM PREPARATION (EXAMPLES 23~39)

To 100 g of the polyol thus obtained in the examples and comparative examples, 1.5 g of water, 1.5 g of silicone surfactant L-5420 (a product of Nippon Unicar Co., Ltd.), amine catalyst Kaolizer No. 1 (a product of Kao Co., Ltd.) and each amount of CFC or HCFC illustrated in Table 17 and 18 were added and mixed to obtain a premix. The premix thus obtained was mixed and reacted with each amount of polyisocyanate (MDI-CR, crude diphenylmethane diisocyanate, a product of Mitsui Toatsu Chemicals, Inc.) illustrated in the same table at the room temperature and poured into a mold to prepare a rigid polyurethane foam.

In the step of preparing the resin premix, mixing and dispersing ability (operation efficiency) between CFC or HCFC and polyol was observed and closed cell content of rigid polyurethane foam were measured. Results are illustrated in the same table.

As seen in Table 17 and 18, polyol(D), polyol(E) and polyol (G) which are respectively a mixture of phenol resin base polyol (A) and aminophenol base polyol (B) or polyphenylpolyxylylenepolyamine base polyol (C) or polymethylenepolyphenylpolyamine base polyol (F) can maintain, in the polyurethane foam production using HCFC or HFC as a foaming agent, equivalent or better operation efficiency and foam propertied as compared with conventional foam production using CFC.

TABLE 16

| Example No. | 12 | 13 | 14 | 15 | 16 | 17 | 18 | 19 | 20 | 21 | 22 |
|---|---|---|---|---|---|---|---|---|---|---|---|
| Polyol No. | D-1 | D-2 | D-3 | D-4 | D-5 | E-1 | E-2 | E-3 | E-4 | E-5 | E-6 |

*Polyurethane Resin*

TABLE 16-continued

| | Polyurethane Resin | | | | | | | | | | |
|---|---|---|---|---|---|---|---|---|---|---|---|
| Example No. | 12 | 13 | 14 | 15 | 16 | 17 | 18 | 19 | 20 | 21 | 22 |
| Formulation (g) | | | | | | | | | | | |
| Polyol (D) or (E) | 30 | 30 | 30 | 30 | 30 | 30 | 30 | 30 | 30 | 30 | 30 |
| MDI-CR | 15.1 | 23.0 | 30.1 | 23.3 | 35.2 | 17.4 | 26.6 | 41.4 | 31.9 | 38.4 | 32.3 |
| Kaolizer No. 1 | 0.1 | 0.1 | 0.1 | 0.1 | 0.1 | 0.1 | 0.1 | 0.1 | 0.1 | 0.1 | 0.1 |
| Absorption (%) | | | | | | | | | | | |
| CFC-11 (24 hr) | 0.0 | 0.0 | 0.0 | 0.0 | 0.0 | 0.0 | 0.0 | 0.0 | 0.0 | 0.0 | 0.0 |
| HCFC-123 (24 hr) | 0.0 | 0.0 | 0.1 | 0.1 | 0.0 | 0.1 | 0.0 | 0.1 | 0.0 | 0.0 | 0.0 |
| HCFC-141b (24 hr) | 0.0 | 0.0 | 0.0 | 0.0 | 0.0 | 0.1 | 0.0 | 0.0 | 0.0 | 0.0 | 0.0 |

Note:
MDI-CR: Crude diphenylmethanediisocyanate a product of MITSUI TOATSU CHEMICALS, INC.
Kaolizer No. 1: Amine base catalyst, a product of Kao Comp.
Absorption: Weight increase rate of a specimen of polyurethane resin having dimensions of 40 × 40 × 7~17 mm after immersion in 50 g of flon.

TABLE 17

| Operation Efficiency in Foam Preparation and Closed Cell Content in Foam | | | | | | | | | | | |
|---|---|---|---|---|---|---|---|---|---|---|---|
| Reference Example No. | 23 | 24 | 25 | 26 | 27 | 28 | 29 | 30 | 31 | 32 | 33 |
| Polyol No. | D-1 | D-2 | D-3 | D-4 | D-5 | E-1 | E-2 | E-3 | E-4 | E-5 | E-6 |
| OH-value (mg KOH/g) | 210 | 320 | 420 | 325 | 496 | 243 | 370 | 577 | 445 | 535 | 450 |
| Viscosity (CP/25° C.) | 1300 | 8800 | 14000 | 7000 | 12000 | 20000 | 10200 | 5800 | 8200 | 12500 | 15800 |
| Formulation (g) | | | | | | | | | | | |
| Polyol | 100 | ← | ← | ← | ← | ← | ← | ← | ← | ← | ← |
| H$_2$O | 1.5 | ← | ← | ← | ← | ← | ← | ← | ← | ← | ← |
| L-5420 | 1.5 | ← | ← | ← | ← | ← | ← | ← | ← | ← | ← |
| Kaolizer No. 1 | 1.2 | 1.2 | 0.8 | 0.8 | 0.8 | 1.2 | 1.2 | 0.8 | 1.2 | 0.8 | 2.0 |
| Foaming agent | 27.0 | 31.3 | 35.3 | 31.5 | 38.0 | 28.3 | 33.3 | 40.6 | 36.3 | 39.8 | 36.4 |
| MDI-CR | 79.9 | 108.8 | 135.1 | 110.0 | 153.5 | 88.5 | 122.0 | 170.6 | 141.7 | 165.4 | 143.0 |
| Operation efficiency | | | | | | | | | | | |
| CFC-11 (24 hr) | | | | | | all good | | | | | |
| HCFC-123 (24 hr) | | | | | | | | | | | |
| HCFC-141b (24 hr) | | | | | | | | | | | |
| Closed cell content (%) | | | | | | | | | | | |
| CFC-11 (24 hr) | 87.5 | 88.0 | 89.5 | 88.2 | 88.3 | 87.9 | 88.1 | 89.5 | 90.3 | 89.5 | 88.2 |
| HCFC-123 (24 hr) | 85.3 | 89.0 | 89.0 | 88.5 | 85.2 | 86.3 | 85.3 | 86.2 | 85.3 | 84.1 | 86.5 |
| HCFC-141b (24 hr) | 87.5 | 88.2 | 87.3 | 86.3 | 85.4 | 86.3 | 86.5 | 86.6 | 85.3 | 88.2 | 88.2 |

Note:
L-5420: Silicon surfactant (a product of Nippon Unica Co. Ltd.)
Closed cell content: Beckmann air comparison hydrometer (a product of Toshiba Beckmann Comp.)
Foaming agent: 3 foaming tests using CFC-11, HCFC-123 and HCFC-141b were carried out respectively according to the formulation in Table 17. Same amount of foaming agent was used. Operation efficiency and closed cell content of foams obtained were measured respectively. Table 18 is the same as Table 17.

TABLE 18

| Operation Efficiency in Foam Preparation and Closed Cell Content in Foam | | | | | | |
|---|---|---|---|---|---|---|
| Reference Example No. | 34 | 35 | 36 | 37 | 38 | 39 |
| Polyol No. | G-1 | G-2 | G-3 | G-4 | G-5 | G-6 |
| OH-value (mg KOH/g) | 262 | 395 | 190 | 475 | 685 | 310 |
| Viscosity (CP/25° C.) | 18000 | 13100 | 14000 | 21000 | 22500 | 12500 |
| Formulation (g) | | | | | | |
| Polyol | 100 | ← | ← | ← | ← | ← |
| H$_2$O | 1.5 | ← | ← | ← | ← | ← |
| L-5420 | 1.5 | ← | ← | ← | ← | ← |
| Kaolizer No. 1 | 1.5 | 1.5 | 1.5 | 1.5 | 0.8 | 1.2 |
| Foaming agent | 29.0 | 34.3 | 26.2 | 37.4 | 45.7 | 30.9 |
| MDI-CR | 93.5 | 128.5 | 74.6 | 149.6 | 204.8 | 106.2 |
| Operation efficiency | | | | | | |
| CFC-11 (24 hr) | | | all good | | | |
| HCFC-123 (24 hr) | | | | | | |
| HCFC-141b (24 hr) | | | | | | |
| Closed Cell Content (%) | | | | | | |
| CFC-11 (24 hr) | 88.5 | 89.3 | 89.0 | 88.0 | 88.5 | 90.1 |
| HCFC-123 (24 hr) | 86.5 | 87.5 | 88.0 | 88.0 | 87.0 | 88.5 |
| HCFC-141b (24 hr) | 87.5 | 87.5 | 89.0 | 87.5 | 87.5 | 87.3 |

RIGID POLYURETHANE FOAM PRODUCTION (CONTINUED) (TABLE 19~22)

Resin premix, was prepared according to the formulation illustrated in Tables 19~22. The premix was rapidly mixed at 5000 rpm for 6 seconds with a prescribed amount of an organic polyisocyanate as illustrated in above Tables. The mixture obtained was immediately poured into vertical, wooden boxes having dimensions of 200×200×200 mm and 380×380×35(thickness)mm.

The mixture was free foamed and thereafter allowed to stand for a day at room temperature.

Specimens having dimensions of 80×80×30mm in size were cut from the former mold and density, compressive strength, and low temperature dimentional stability were measured in accordance with JIS A 9514.

A specimens having dimensions of 200×200×25mm in size were cut from the latter mold and heat conductivity were measured in accordance with JIS A 1412.

Results are illustrated in Tables 19~22.

(1) Preparation of rigid polyurethane foam composite having facing material

According to the above examples, preparation of a rigid polyurethane foam composite having facing material of the invention was carried out.

Polyols obtained in examples and comparative examples illustrated in Table 11 and Table 23 were used as the raw material of rigid polyurethane foams.

TABLE 19

Foam Property (Example 40~53, Comparative Example 1~7)

| | Com. Ex 1 | Example 40 | Example 41 | Com. Ex 2 | Example 42 | Example 43 | Com. Ex 3 | Example 44 | Example 45 | Com. Ex 4 | Example 46 | Example 47 |
|---|---|---|---|---|---|---|---|---|---|---|---|---|
| Raw material (g) | | | | | | | | | | | | |
| MDI-CR | | 79.9 | | | 108.8 | | | 135.1 | | | 110.1 | |
| Polyol D-1 | | 100 | | | | | | | | | | |
| Polyol D-2 | | | | | 100 | | | | | | | |
| Polyol D-3 | | | | | | | | 100 | | | | |
| Polyol D-4 | | | | | | | | | | | 100 | |
| Polyol D-5 | | | | | | | | | | | | |
| $H_2O$ | | 1.5 | | | 1.5 | | | 1.5 | | | 1.5 | |
| L-5420 | | 1.5 | | | 1.5 | | | 1.5 | | | 1.5 | |
| Kaolizer No. 1 | | 1.2 | | | 1.2 | | | 0.8 | | | 0.8 | |
| Foaming agent | | | | | | | | | | | | |
| CFC-11 | 30 | | | 31 | | | 35 | | | 32 | | |
| HCFC-141b | | 23 | | | 27 | | | 31 | | | 27 | |
| HCFC-123 | | | 32 | | | 38 | | | 42 | | | 38 |
| HFC-134a | | | | | | | | | | | | |
| Isopentane | | | | | | | | | | | | |
| Foam properties | | | | | | | | | | | | |
| Density (kg/m³) | 25.5 | 24.9 | 25.8 | 24.3 | 24.0 | 24.8 | 25.2 | 25.0 | 25.5 | 24.2 | 23.9 | 24.5 |
| Compressive Strength (kg/cm²) | 1.86 | 1.80 | 1.80 | 1.70 | 1.65 | 1.60 | 1.80 | 1.80 | 1.75 | 1.71 | 1.61 | 1.60 |
| Low temperature dimentional stability (%, −30° C. × 24 hr) | −0.1 | −0.3 | −0.3 | −0.1 | −0.2 | −0.3 | 0.0 | 0.0 | −0.2 | −0.1 | −0.2 | −0.4 |
| Heat conductivity (Kcal/mhr °C.) | 0.0160 | 0.0162 | 0.0165 | 0.0150 | 0.0150 | 0.0163 | 0.0160 | 0.0160 | 0.0163 | 0.0160 | 0.0161 | 0.0163 |

| | Com. Ex 5 | Example 48 | Example 49 | Com. Ex 6 | Example 50 | Example 51 | Com. Ex 7 | Example 52 | Example 53 |
|---|---|---|---|---|---|---|---|---|---|
| Raw material (g) | | | | | | | | | |
| MDI-CR | | 153.5 | | | 135.1 | | | 135.1 | |
| Polyol D-1 | | | | | | | | | |
| Polyol D-2 | | | | | | | | | |
| Polyol D-3 | | | | | 100 | | | 100 | |
| Polyol D-4 | | | | | | | | | |
| Polyol D-5 | | 100 | | | | | | | |
| $H_2O$ | | 1.5 | | | 1.5 | | | 1.5 | |
| L-5420 | | 1.5 | | | 1.5 | | | 1.5 | |
| Kaolizer No. 1 | | 0.8 | | | 0.8 | | | 0.8 | |
| Foaming agent | | | | | | | | | |
| CFC-11 | 23 | | | 35 | | | 35 | | |
| HCFC-141b | | 20 | | | 31 | | | 31 | |
| HCFC-123 | | | 28 | | | 39 | | | 39 |
| HFC-134a | | | | | | | | | 5 |
| Isopentane | | | | | | 5 | | | |
| Foam properties | | | | | | | | | |
| Density (kg/m³) | 25.3 | 25.0 | 25.3 | 25.2 | 25.0 | 26.0 | 25.2 | 25.0 | 25.9 |
| Compressive Strength (kg/cm²) | 1.80 | 1.76 | 1.70 | 1.80 | 1.80 | 1.70 | 1.80 | 1.80 | 1.71 |
| Low temperature dimentional stability (%, −30° C. × 24 hr) | −0.2 | −0.2 | −0.3 | 0.0 | 0.0 | −0.4 | 0.0 | 0.0 | −0.3 |
| Heat conductivity (Kcal/mhr °C.) | 0.0160 | 0.0162 | 0.0163 | 0.0160 | 0.0160 | 0.0165 | 0.0160 | 0.0160 | 0.0165 |

Note:
(1) Com. Ex: Comparative Example
(2) Density: Free foaming

TABLE 20

Foam Property (Example 54~67, Comparative Example 8~14)

| | Com. Ex 8 | Example 54 | Example 55 | Com. Ex 9 | Example 56 | Example 57 | Com. Ex 10 | Example 58 | Example 59 | Com. Ex 11 | Example 60 | Example 61 |
|---|---|---|---|---|---|---|---|---|---|---|---|---|

TABLE 20-continued

Foam Property (Example 54~67, Comparative Example 8~14)

| Raw material (g) | | | | | | | | | | | | |
|---|---|---|---|---|---|---|---|---|---|---|---|---|
| MDI-CR | | 88.5 | | | 122.0 | | | 170.6 | | | 141.7 | |
| Polyol E-1 | | 100 | | | | | | | | | | |
| Polyol E-2 | | | | | 100 | | | | | | | |
| Polyol E-3 | | | | | | | | 100 | | | | |
| Polyol E-4 | | | | | | | | | | | 100 | |
| Polyol E-5 | | | | | | | | | | | | |
| H₂O | | 1.5 | | | 1.5 | | | 1.5 | | | 1.5 | |
| L-5420 | | 1.5 | | | 1.5 | | | 1.5 | | | 1.5 | |
| Kaolizer No. 1 | | 1.2 | | | 1.2 | | | 0.8 | | | 1.2 | |
| Foaming agent | | | | | | | | | | | | |
| CFC-11 | 28 | | | 33 | | | 41 | | | 36 | | |
| HCFC-141b | | 25 | | | 29 | | | 35 | | | 31 | |
| HCFC-123 | | | 34 | | | 40 | | | 49 | | | 44 |
| HFC-134a | | | | | | | | | | | | |
| Isopentane | | | | | | | | | | | | |
| Foam properties | | | | | | | | | | | | |
| Density (kg/m³) | 24.3 | 24.1 | 24.8 | 24.5 | 24.2 | 25.5 | 25.6 | 25.4 | 25.8 | 25.2 | 25.0 | 25.5 |
| Compressive Strength (kg/cm²) | 1.80 | 1.80 | 1.73 | 1.75 | 1.70 | 1.70 | 1.75 | 1.74 | 1.74 | 1.75 | 1.77 | 1.74 |
| Low temperature dimentional stability (%, −30° C. × 24 hr) | −0.3 | −0.2 | −0.3 | 0.0 | −0.1 | −0.3 | −0.2 | −0.1 | −0.4 | −0.1 | −0.1 | −0.2 |
| Heat conductivity (Kcal/mhr °C.) | 0.0160 | 0.0163 | 0.0164 | 0.0160 | 0.0162 | 0.0165 | 0.0162 | 0.0163 | 0.0165 | 0.0165 | 0.0166 | 0.0168 |

| | Com. Ex 12 | Example 62 | Example 63 | Com. Ex 13 | Example 64 | Example 65 | Com. Ex 14 | Example 66 | Example 67 |
|---|---|---|---|---|---|---|---|---|---|
| Raw material (g) | | | | | | | | | |
| MDI-CR | | 165.4 | | | 141.7 | | | 141.7 | |
| Polyol E-1 | | | | | | | | | |
| Polyol E-2 | | | | | | | | | |
| Polyol E-3 | | | | | | | | | |
| Polyol E-4 | | | | | 100 | | | 100 | |
| Polyol E-5 | | 100 | | | | | | | |
| H₂O | | 1.5 | | | 1.5 | | | 1.5 | |
| L-5420 | | 1.5 | | | 1.5 | | | 1.5 | |
| Kaolizer No. 1 | | 0.8 | | | 1.2 | | | 1.2 | |
| Foaming agent | | | | | | | | | |
| CFC-11 | 40 | | | 36 | | | 36 | | |
| HCFC-141b | | 35 | | | 31 | | | 31 | |
| HCFC-123 | | | 48 | | | 40 | | | 40 |
| HFC-134a | | | | | | 5 | | | |
| Isopentane | | | | | | | | | 5 |
| Foam properties | | | | | | | | | |
| Density (kg/m³) | 25.5 | 25.2 | 26.0 | 25.2 | 25.0 | 26.0 | 25.2 | 25.0 | 26.0 |
| Compressive Strength (kg/cm²) | 1.79 | 1.75 | 1.77 | 1.75 | 1.77 | 1.70 | 1.75 | 1.77 | 1.71 |
| Low temperature dimentional stability (%, −30° C. × 24 hr) | −0.1 | 0.0 | −0.3 | −0.1 | −0.1 | −0.3 | −0.1 | −0.1 | −0.3 |
| Heat conductivity (Kcal/mhr °C.) | 0.0158 | 0.0159 | 0.0162 | 0.0165 | 0.0166 | 0.0169 | 0.0165 | 0.0166 | 0.0169 |

TABLE 21

Foam Property (Example 68~81, Comparative Example 15~21)

| | Com. Ex 15 | Example 68 | Example 69 | Com. Ex 16 | Example 70 | Example 71 | Com. Ex 17 | Example 72 | Example 73 | Com. Ex 18 | Example 74 | Example 75 |
|---|---|---|---|---|---|---|---|---|---|---|---|---|
| Raw material (g) | | | | | | | | | | | | |
| MDI-CR | | 93.5 | | | 128.5 | | | 74.6 | | | 149.6 | |
| Polyol G-1 | | 100 | | | | | | | | | | |
| Polyol G-2 | | | | | 100 | | | | | | | |
| Polyol G-3 | | | | | | | | 100 | | | | |
| Polyol G-4 | | | | | | | | | | | 100 | |
| Polyol G-5 | | | | | | | | | | | | |
| H₂O | | 1.5 | | | 1.5 | | | 1.5 | | | 1.5 | |
| L-5420 | | 1.5 | | | 1.5 | | | 1.5 | | | 1.5 | |
| Kaolizer No. 1 | | 1.5 | | | 1.5 | | | 1.5 | | | 1.5 | |
| Foaming agent | | | | | | | | | | | | |
| CFC-11 | 29 | | | 34 | | | 26 | | | 37 | | |
| HCFC-141b | | 25 | | | 30 | | | 23 | | | 32 | |
| HCFC-123 | | | 35 | | | 41 | | | 31 | | | 45 |
| HFC-134a | | | | | | | | | | | | |
| Isopentane | | | | | | | | | | | | |

TABLE 21-continued

Foam Property (Example 68~81, Comparative Example 15~21)

| Foam properties | | | | | | | | | | | | |
|---|---|---|---|---|---|---|---|---|---|---|---|---|
| Density (kg/m$^3$) | 24.6 | 24.7 | 25.2 | 24.8 | 25.0 | 25.5 | 24.4 | 24.5 | 25.5 | 25.0 | 25.1 | 25.8 |
| Compressive Strength (kg/cm$^2$) | 1.50 | 1.25 | 1.19 | 1.30 | 1.20 | 1.15 | 1.50 | 1.30 | 1.25 | 1.50 | 1.30 | 1.25 |
| Low temperature dimentional stability (%, −30° C. × 24 hr) | −0.2 | −0.8 | −1.0 | −0.6 | −0.7 | −1.0 | −0.2 | −0.4 | −1.0 | −0.2 | −0.6 | −0.6 |
| Heat conductivity (Kcal/mhr °C.) | 0.0165 | 0.0168 | 0.0170 | 0.0168 | 0.0170 | 0.0172 | 0.0163 | 0.0165 | 0.0167 | 0.0163 | 0.0166 | 0.0168 |

| | Com. Ex | Example | | Com. Ex | Example | | Com. Ex | Example | |
|---|---|---|---|---|---|---|---|---|---|
| | 19 | 76 | 77 | 20 | 78 | 79 | 21 | 80 | 81 |
| Raw material (g) | | | | | | | | | |
| MDI-CR | | 204.8 | | | 149.6 | | | 149.6 | |
| Polyol G-1 | | | | | | | | | |
| Polyol G-2 | | | | | | | | | |
| Polyol G-3 | | | | | | | | | |
| Polyol G-4 | | | | | 100 | | | 100 | |
| Polyol G-5 | | 100 | | | | | | | |
| H$_2$O | | 1.5 | | | 1.5 | | | 1.5 | |
| L-5420 | | 1.5 | | | 1.5 | | | 1.5 | |
| Kaolizer No. 1 | | 0.8 | | | 1.5 | | | 1.5 | |
| Foaming agent | | | | | | | | | |
| CFC-11 | 31 | | | 37 | | | 37 | | |
| HCFC-141b | | 27 | | | 32 | | | 32 | |
| HCFC-123 | | | 37 | | | 40 | | | 40 |
| HFC-134a | | | | | | 5 | | | |
| Isopentane | | | | | | | | | 5 |
| Foam properties | | | | | | | | | |
| Density (kg/m$^3$) | 25.5 | 25.9 | 26.0 | 25.0 | 25.1 | 26.0 | 25.0 | 25.1 | 26.2 |
| Compressive Strength (kg/cm$^2$) | 1.82 | 1.65 | 1.63 | 1.50 | 1.30 | 1.24 | 1.50 | 1.30 | 1.23 |
| Low temperature dimentional stability (%, −30° C. × 24 hr) | −0.2 | −0.8 | −1.4 | −0.2 | −0.6 | −0.7 | −0.2 | −0.6 | −0.8 |
| Heat conductivity (Kcal/mhr °C.) | 0.0159 | 0.0163 | 0.0161 | 0.0163 | 0.0166 | 0.0169 | 0.0163 | 0.0166 | 0.0169 |

TABLE 22

Foam Property (Comparative Example 22~27)

| | Comparative Example | | | | | |
|---|---|---|---|---|---|---|
| | 22 | 23 | 24 | 25 | 26 | 27 |
| Raw material (g) | | | | | | |
| MDI-CR | | 144 | | | 144 | |
| Polyol R-1 | | 100 | | | | |
| Polyol R-2 | | | | | 100 | |
| H$_2$O | | 1.5 | | | 1.5 | |
| L-5420 | | 1.5 | | | 1.5 | |
| Kaolizer No. 1 | | 3.0 | | | 3.0 | |
| Foaming agent | | | | | | |
| CFC-11 | 37 | | | 37 | | |
| HCFC-141b | | 30 | | | 30 | |
| HCFC-123 | | | 44 | | | 44 |
| Foam properties | | | | | | |
| Density (kg/m$^3$) | 24.5 | 25.1 | 25.2 | 25.0 | 25.2 | 25.3 |
| Compressive Strength (kg/cm$^2$) | 1.51 | 0.97 | 1.01 | 1.61 | 0.98 | 0.95 |
| Low temperature dimensional stability (%, −30° C. × 24 hr) | −0.5 | −3.6 | −5.8 | −1.0 | −4.5 | −7.5 |
| Heat conductivity (Kcal/mhr °C.) | 0.0170 | 0.0180 | 0.0185 | 0.0165 | 0.0180 | 0.0182 |

TABLE 23

| Polyol No. | R-1 | R-2 |
|---|---|---|
| Polyhydric alcohol | glycerol | glycerol, sucrose |
| Alkylene oxide | propylene oxide | propylene oxide |
| Hydroxyl value (mg KOH/g) | 450 | 450 |
| Viscosity (cp/25° C.) | 480 | 8500 |

The facing material for use in the invention includes corrugated paper boards, laminated papers and other paper products, polyethylene, polypropylene, polyvinyl chloride and other synthetic resin plates; and aluminum, steel and other metal plates.

1) Polyurethane foam composite having one facing material(Table 24, 25)

The same formulations as illustrated in Table 24 were sprayed on a facing material under the following conditions to prepare a rigid polyurethane foam having one facing material. Properties of the product obtained are summarized in Table 25.

| Atomizer: | Model - FF Head D Gum (a product of Gusmer Co., Ltd.) |
|---|---|
| Output pressure: | 50 kg/cm² |
| Liquid temperature: | 40° C. |
| Face material: | Corrugated paper board |

2) Preparation of rigid polyurethane foam having a plurality of facing material (Table 26, 27)

In the test, rigid polyurethane foam composite boards having two facing materials were prepared with a continuous process under the following conditions by using the formulations illustrated in Table 26.

Properties of the product obtained are summarized in Table 27.

| Foaming machine: | High pressure foam dispensing machine Model-MQ. (a product of Hennecke Machinen Bau) |
|---|---|
| Line Speed: | 10 m/min |
| Temperature: | Material: 30–40° C. Cure oven: 55° C. |
| Product: | 1 m Width × 40 mm Thickness |
| Facing material: | 35 mm Foam layer<br>Laminated paper on the top and bottom |

As seen in these results, the polyols of the invention have suitable reactivity. Consequently, the mixture of foaming ingredients does not cause sagging phenomenon, even when it is sprayed on a vertical face material, and can give good appearance on the surface of spray applied foam. Good adhesion of sprayed foam to the face material can also be obtained. The rigid foam thus obtained has excellent flame retardance and low heat conductivity, and thus provides composite boards having excellent performance.

The formulations used in the preparation of rigid polyurethane foam composites are illustrated in Table 24 and 25. However, the formulations are not limited to the above embodiment and it is to be understood that the formulations illustrated in Table 11 and Table 15 (polyol D, E and G) can also be used for the preparation of polyurethane foam composites.

TABLE 24

|  | Example | | | Comparative Example | | |
|---|---|---|---|---|---|---|
|  | 82 | 83 | 84 | 28 | 29 | 30 |
| Formulation (g) | | | | | | |
| MDI-CR | 145.3 | 145.3 | 133.5 | 127 | 127 | 127 |
| Polyol | | | | | | |
| D-5 | 100 | 100 | | | | |
| E-4 | | | 100 | | | |
| R-1 | | | | 100 | 100 | |
| R-2 | | | | | | 100 |
| TCEP | 10 | 10 | 10 | 10 | 10 | 10 |
| H₂O | 0.5 | 0.5 | 0.5 | 0.5 | 0.5 | 0.5 |
| L-5420 | 1.5 | 1.5 | 1.5 | 1.5 | 1.5 | 1.5 |
| Kaolizer No. 1 | 2.4 | 2.4 | 3.6 | 5.0 | 5.0 | 5.0 |
| LL-690D | 0.1 | 0.1 | 0.1 | 0.1 | 0.1 | 0.1 |
| CFC-11 | | | | 19 | | |
| HCFC-141b | 32 | | | | 17 | |
| HCFC-123 | | 44 | 42 | | | 23 |

Note:
TCEP: Flame retardant, Tris (2-chloroethyl) phosphate a product of Daihachi Chem. Co.
LL-690D: Catalyst, Lead octoate of 40% by weight dioctylphtharate solution

TABLE 25

|  | Example | | | Comparative Example | | |
|---|---|---|---|---|---|---|
|  | 82 | 83 | 84 | 28 | 29 | 30 |
| Formulation (in Table 24) | Ex. 82 | Ex. 83 | Ex. 84 | C. Ex. 28 | C. Ex. 29 | C. Ex. 30 |
| Reactivity | 4~5 | 4~5 | 4~5 | 5 | 5~6 | 5 |
| Tack-free time (sec.) | | | | | | |
| Sag phenomenon (1) | none | none | none | none | exist | exist |
| Surface appearance | good | good | good | good | good | good |
| Adhesion | good | good | good | good | good | good |
| Foam density (kg/m³) | 36.4 | 36.8 | 36.8 | 38.0 | 39.0 | 39.0 |
| Compressive strength (kg/cm²) | 3.34 | 3.35 | 3.30 | 3.25 | 3.10 | 2.95 |
| Heat conductivity (kcal/mhr °C.) | 0.0165 | 0.0167 | 0.0170 | 0.0180 | 0.0190 | 0.0188 |
| Combustibility (2) | | | | | | |
| Combustion time (sec.) | 22 | 20 | 21 | 24 | 35 | 33 |
| Burned distance (mm) | 18 | 17 | 19 | 19 | 20 | 21 |

Note:
(1) Sag is a phenomenon where a raw material mixture before curing sags or runs down on a vertical surface when the mixture is sprayed to foam on the surface.
(2) Cumbustibility (Flame retardation): ASTM D 1691
(3) In formulation, Ex. indicates Example No. C. Ex. indicates Comparative Example No.

TABLE 26

|  | Example | | | Comparative Example | | |
|---|---|---|---|---|---|---|
|  | 85 | 86 | 87 | 31 | 32 | 33 |
| Formulation (g) | | | | | | |
| MDI-CR | 135 | 135 | 143 | 144 | 144 | 144 |
| Polyol | | | | | | |
| D-3 | 100 | 100 | | | | |
| E-6 | | | 100 | | | |
| R-1 | | | | 100 | 100 | |
| R-2 | | | | | | 100 |
| TCEP | 10 | 10 | 10 | 10 | 10 | 10 |
| H₂O | 1.5 | 1.5 | 1.5 | 1.5 | 1.5 | 0.5 |
| L-5420 | 1.5 | 1.5 | 1.5 | 1.5 | 1.5 | 1.5 |
| Kaolizer No. 1 | 0.8 | 0.8 | 2.0 | 3.0 | 3.0 | 2.8 |
| CFC-11 | | | | 37 | | |
| HCFC-141b | 32 | | | | 30 | |
| HCFC-123 | | 42 | 43 | | | 44 |

TABLE 27

|  | Example | | | Comparative Example | | |
|---|---|---|---|---|---|---|
|  | 85 | 86 | 87 | 31 | 32 | 33 |
| Formulation (in Table 26) | 85 | 86 | 87 | 31 | 32 | 33 |
| Adhesion between face material and foam | good | good | good | good | good | good |

TABLE 27-continued

| | Example | | | Comparative Example | | |
|---|---|---|---|---|---|---|
| | 85 | 86 | 87 | 31 | 32 | 33 |
| Foam density (kg/m$^3$) | 30.3 | 31.5 | 31.0 | 30.0 | 31.0 | 31.5 |
| Compressive strength (kg/cm$^2$) | 1.64 | 1.75 | 1.60 | 1.55 | 1.05 | 1.00 |
| Flexural strength (kg/cm$^2$) | 2.50 | 2.40 | 2.44 | 2.45 | 1.95 | 1.85 |
| Heat conductivity (kcal/mhr °C.) | 0.0163 | 0.0165 | 0.0170 | 0.0170 | 0.0185 | 0.0186 |
| Combustibility | | | | | | |
| Combustion time (sec.) | 22 | 21 | 21 | 23 | 30 | 31 |
| Combustion distance (mm) | 16 | 14 | 15 | 16 | 21 | 20 |

What is claimed is:

1. A polyol (D) having a hydroxyl value of from 180 to 700 mgKOH/g which comprises (i) polyol (a), polyol (b) and polyol (d), or(ii) polyol (a), polyol (b), polyol (c) and polyol (d):

said polyol (a) having a hydroxyl value of from 140 to 350 mgKOH/g and being prepared by the addition of from 1.0 to 4.5 moles of an alkylene oxide to one equivalent of hydroxyl of a phenol resin or a mixture hereof having a number average molecular weight of from 650 to 1400, an average functionality of from 3 to 8 and the formula (I):

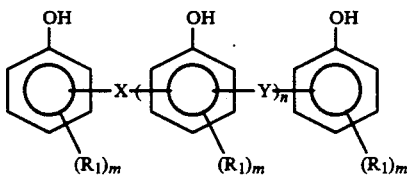

wherein R$_1$ is a hydrogen atom, alkyl having from 1 to 9 carbon atoms, halogen atom selected from chlorine, bromine and fluorine, or hydroxyl, m is an integer of from 1 to 3, n is an integer of from 1 to 6, and X and Y are same or different divalent groups selected from the group consisting of an alkylene having from 1 to 10 carbon atoms, xylylene, oxy, thio and sulfonyl or bonded group of the above-mentioned groups; said polyol (b) having a hydroxyl value of 240 to 800 mgKOH/g and being obtained by adding from 0.5 to 3.0 moles of an alkylene oxide to one equivalent of active hydrogen in an alkanolamine series compound of a mixture thereof having the formula (II):

NR$_2$R$_2$R$_3$     (II)

wherein R$_2$ and R$_3$ are respectively a hydrogen atom, hydroxyethyl or hydroxyisopropyl, R$_2$ and R$_3$ are same or different and excluding the case wherein both R$_2$ and R$_3$ are hydrogen atoms; said polyol (c) having a hydroxyl value of 130 to 750 mgkoh/g and being obtained by the addition of from 0.5 to 6.5 moles of an alkylene oxide to one equivalent of hydroxyl group in an active halogen containing compound which is an aliphatic polyhydroxy compound having average functionality of from 2 to 8 or a mixture thereof; and said polyol (d) having a hydroxyl value of from 150 to 700 mgKOH/g and being obtained by adding from 1.0 to 9.0 moles of an alkylene oxide to one equivalent of active hydrogen in an amino phenol series compound or a mixture thereof having a number average molecular weight of from 100 to 200, an average functionality of from 3 to 6, and formula (III):

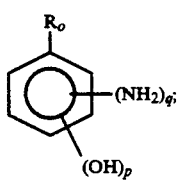

wherein R$_0$ is a hydrogen atom, aliphatic hydrocarbon group having from 1 to 5 carbon atoms, or alicyclic hydrocarbon group, q is an integer of from 1 to 2, and p is an integer of from 1 to 2.

2. The polyol(D) of claim 1 wherein the phenol resin is a novolak resin represented by the formula (I) wherein R$_1$ is a hydrogen atom and both X and Y are methylene.

3. The polyol(D) of claim 2 wherein the novolak resin has a number average molecular weight of from 650 to 900, average functionality of from 3 to 8, and a softening point of from 75° to 120° C.

4. The polyol(D) of claim 1 having a polyol(a)/polyol(b) ratio of from 0.25 to 4.0 by weight, a polyol(a)/polyol(c) ratio of from 0.1 to 4.0 by weight, and a polyol(a)/polyol(d) ratio of about 1.0.

5. A polyol(E) having a hydroxyl value of from 180 to 700 mgKOH which comprises (i) polyol(a), polyol(b) and polyol(e), or (ii) polyol(a), polyol(b), polyol(c) and polyol(e), polyol(a), polyol(b) and polyol(c) being the same as polyol(a), polyol(b) and polyol(c) according to claim 1, said polyol(e) having a hydroxyl value of from 150 to 700 mgKOH/g and being obtained by adding from 1.0 to 9.0 moles of an alkylene oxide to one equivalent of active hydrogen in a polyphenylpolyxylylenepolyamine series compound or a mixture thereof having a number average molecular weight of from 300 to 1500, average functionality of from 4 to 8 and the formula (IV):

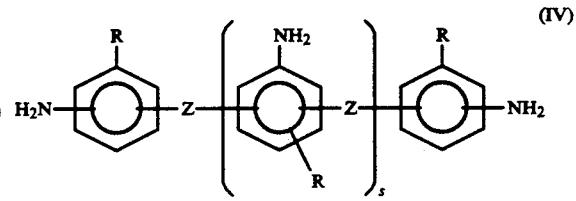

wherein R is a hydrogen atom, aliphatic hydrocarbon group having from 1 to 10 carbon atoms, or an alicyclic hydrocarbon group, Z is xylylene group and s is an integer of from 0 to 10.

6. Polyol(E) of claim 5, having a polyol(e)/polyol(b) ratio of from 0.25 to 4.0 by weight and polyol(e)/polyol(c) ratio of from 0.1 to 4.0 by weight.

7. A polyurethane resin obtained by the reaction of a polyol with an organic polyisocyanate, a portion or the whole of said polyol comprising the polyol(D) of claim 1.

8. A polyurethane resin obtained by the reaction of polyol with an organic polyisocyanate, a portion or the whole of said polyol comprising the polyol (E) of claim 5.

9. The polyurethane resin of claim 8 wherein the organic polyisocyanate comprises an isocyanate terminated prepolymer.

10. The polyurethane resin of claim 8 wherein the equivalent ratio of an isocyanate group in the organic polyisocyanate to a hydroxyl group in the polyol is in the range of from 0.8 to 5.0.

11. A rigid polyurethane foam obtained by the reaction of an organic polyisocyanate with a resin premix comprising a polyol, foaming agent, catalyst, cell regulator, other additives and optionally an auxiliary foaming agent, said polyol comprising a portion or the whole of polyol(D) of claim 1, said foaming agent comprising a single compound or a mixture thereof selected from the group consisting of a hydrochlorofluorocarbon or a hydrofluorocarbon.

12. A rigid polyurethane foam obtained by the reaction of an organic polyisocyanate with a resin premix comprising a polyol, foaming agent, catalyst, cell regulator, other additives and optionally an auxiliary foaming agent, said polyol comprising a portion or the whole of polyol (E) of claim 5, said foaming agent comprising a single compound or a mixture thereof selected from the group consisting of a hydrochlorofluorocarbon or a hydrofluorocarbon.

13. The rigid polyurethane foam of claim 12 wherein the hydrochlorofluorocarbon is 2,2-dichloro-1,1,1-trifluoroethane, 1,1-dichloro-1-fluoroethane or 1-chloro-1,1-difluoromethane, and the hydrofluorocarbon is 1,1,1,2-tetrafluoroethane or 1,1-difluoroethane.

14. The rigid polyurethane foam of claim 12 wherein the auxiliary foaming agent is water, a low boiling point compound or mixtures thereof.

15. The rigid polyurethane foam of claim 12 wherein the organic polyisocyanate comprises an isocyanate terminated prepolymer.

16. The rigid polyurethane foam of claim 12 wherein the equivalent ratio of an isocyanate group in the organic polyisocyanate to a hydroxyl group in the polyol is in the range of from 0.8 to 5.0.

17. A preparation process of a rigid polyurethane foam by reacting an organic polyisocyanate with a resin premix comprising a polyol, foaming agent, catalyst, cell regulator other additives and optionally an auxiliary foaming agent, said polyol comprising a portion or the whole of polyol(D) of claim 1, said foaming agent comprising a single compound or a mixture thereof selected from the group consisting of a hydrochlorofluorocarbon or a hydrofluorocarbon.

18. A preparation process of a rigid polyurethane foam by reacting an organic polyisocyanate with a resin premix comprising a polyol, foaming agent, catalyst, cell regulator other additives and optionally an auxiliary foaming agent, said polyol comprising a portion or the whole of polyol (E) of claim 5, said foaming agent comprising a single compound or mixture thereof selected from the group consisting of a hydrochlorofluorocarbon or a hydrofluorocarbon.

19. The preparation process of claim 18 wherein a portion or the whole of the organic polyisocyanate comprises an isocyanate terminated prepolymer.

20. The preparation process of claim 18 wherein the equivalent ratio of an isocyanate group in the organic polyisocyanate to a hydroxyl group in the polyol is in the range of from 0.8 to 5.0.

21. A preparation process of a rigid polyurethane foam composite by reacting an organic polyisocyanate with a premix comprising a polyol, foaming agent, catalyst, cell regulator, other additives and optionally an auxiliary foaming agent to form a rigid polyurethane foam on a face material or in a cavity surrounded by a plurality of face material, said polyol comprising a portion or the whole of polyol(D) of claim 1, said foaming agent comprising a single compound or a mixture thereof select from the group consisting of a hydrochlorofluorocarbon and a hydrofluorocarbon.

22. A preparation process of a rigid polyurethane foam composite by reacting an organic polyisocyanate with a premix comprising a polyol, foaming agent, catalyst, cell regulator, other additives and optionally an auxiliary foaming agent to form a rigid polyurethane foam on a face material or in a cavity surrounded by a plurality of face material, said polyol comprising a portion or the whole of polyol (E) of claim 9, said foaming agent comprising a single compound or a mixture thereof select from the group consisting of a hydrochlorofluorocarbon and a hydrofluorocarbon.

23. The preparation process of claim 1 wherein the rigid polyurethane foam is formed by a coating, pouring or spraying process.

24. The preparation process of claim 22 wherein a portion or the whole of the organic polyisocyanate comprises an isocyanate terminated prepolymer.

25. The preparation process of claim 22 wherein the equivalent ratio of an isocyanate group in the organic polyisocyanate to a hydroxyl group in the polyol is in the range of from 0.8 to 5.0.

26. A rigid polyurethane foam obtained by reacting an organic polyisocyanate with a resin premix comprising a polyol, foaming agent, catalyst, cell regulator, other additives and optionally an auxiliary foaming agent, said polyol comprising a portion or the whole of polyol (G) having a hydroxyl value of from 180 to 700 mgKOH/g and said polyol(G) comprising (i) polyol (a), polyol (b) and polyol (f), or (ii) polyol (a), polyol (b), polyol (c) and polyol (f), polyol (a), polyol (b) and polyol (c) being the same as polyol (a), polyol (b) and polyol (c) according to claim 2, said polyol (f) having a hydroxyl value of from 150 to 700 mgKOH/g and being obtained by the addition of from 1.0 to 9.0 moles of an alkylene oxide to one equivalent of active hydrogen in polymethylenepolyphenylpolyamine and, said foaming agent comprising a compound or a mixture thereof selected from the group consisting of a hydrochlorofluorocarbon and a hydrofluorocarbon.

27. The rigid polyurethane foam of claim 26 wherein a portion or the whole of the organic polyisocyanate comprises an isocyanate terminated prepolymer.

28. The rigid polyurethane foam of claim 26 wherein the equivalent ratio of an isocyanate group in the organic polyisocyanate to a hydroxyl group of the polyol is in the range of from 0.8 to 5.0.

29. A preparation process of rigid polyurethane foam by the reaction of an organic polyisocyanate with a resin premix comprising polyol, foaming agent, catalyst, cell regulator, other additives and optionally an auxiliary foaming agent, said polyol comprising a portion or the whole of poyol (G) according to claim 26 having a hydroxyl value of from 180 to 700 mgKOH/g and said foaming agent comprising a compound or a mixture thereof selected from the group consisting of a hydrochlorofluorocarbon and a hydrofluorocarbon.

30. The preparation process of claim 29 wherein a portion or the whole of the organic polyisocyanate comprises an isocyanate terminated prepolymer.

31. The preparation process of claim 29 wherein the equivalent ratio of an isocyanate group in the organic polyisocyanate to a hydroxyl group in the polyol is in the range of from 0.8 to 5.0.

32. A preparation process of a rigid polyurethane foam composite by the reaction of an organic polyisocyanate with a resin premix comprising a polyol, foaming agent, catalyst, cell regulator, at least one other additive, and optionally, an auxiliary foaming agent to form rigid polyurethane foam on a face material or in a cavity surrounded by a plurality of face material, said polyol comprising a portion or the whole of polyol (G) according to claim 30 having a hydroxyl value of from 180 to 700 mgKOH/g, and said foaming agent comprising a compound or a mixture thereof selected from the group consisting of a hydrochlorofluorocarbon and a hydrofluorocarbon.

33. The preparation process of claim 32 wherein a portion or the whole of the organic polyisocyanate comprises an isocyanate terminated prepolymer.

34. The preparation process of claim 32 wherein the equivalent ratio of an isocyanate group in the organic polyisocyanate to a hydroxyl group in the polyol is in the range of from 0.8 to 5.0.

35. The preparation process of claim 32 wherein the rigid polyurethane foam is formed by coating, pouring or spraying.

36. The polyurethane resin of claim 7 wherein the organic polyisocyanate comprises an isocyanate terminated prepolymer.

37. The polyurethane resin of claim 7 wherein the equivalent ratio of an isocyanate group in the organic polyisocyanate to a hydroxyl group in the polyol is in the range of 0.8 to 5.0.

38. The rigid polyurethane foam of claim 11 wherein the hydrochlorofluorocarbon is 2,2-dichloro-1,1,1-trifluoroethane, 1,1-dichloro-1-fluoroethane or 1-chloro-1,1-difluoromethane, and the hydrofluorocarbon is 1,1,1,2-tetrafluoroethane or 1,1-difluoroethane.

39. The rigid polyurethane foam of claim 11 wherein the auxiliary foaming agent is water, a low boiling point compound or mixture thereof.

40. The rigid polyurethane foam of claim 11 wherein the organic polyisocyanate comprises an isocyanate terminated prepolymer.

41. The rigid polyurethane foam of claim 11 wherein the equivalent ratio of an isocyanate group in the organic polyisocyanate to a hydroxyl group in the polyol is in the range of from 0.8 to 5.0.

42. The preparation process of claim 17 wherein a portion or the whole of the organic polyisocyanate comprises an isocyanate terminated prepolymer.

43. The preparation process of claim 17 wherein the equivalent ratio of an isocyanate group in the organic polyisocyanate to a hydroxyl group in the polyol is in the range of form 0.8 to 5.0.

44. The preparation process of claim 21 wherein the rigid polyurethane foam is formed by a coating, pouring or spraying process.

45. The preparation process of claim 21 wherein a portion or the whole of the organic polyisocyanate comprises an isocyanate terminated prepolymer.

46. The preparation process of claim 21 wherein the equivalent ratio of an isocyanate group in the organic polyisocyanate to a hydroxyl group in the polyol is in the range of from 0.8 to 5.0.

* * * * *

UNITED STATES PATENT AND TRADEMARK OFFICE
CERTIFICATE OF CORRECTION

PATENT NO. : 5,198,475
DATED : March 30, 1993
INVENTOR(S) : Kimura et al.

It is certified that error appears in the above-identified patent and that said Letters Patent is hereby corrected as shown below:

Column 29, line 57, delete "mgkoh/g" and insert therefor --mgKOH/g--.

Column 32, line 19, amend "select" to --selected--;

line 28, delete "claim 9" and insert therefor --claim 5--;

line 30, amend "select" to --selected--;

line 32, delete "claim 1" and insert therefor --claim 22--; and line 52, delete "claim 2" and insert therefor --claim 1--.

Column 34, line 29, delete "form" and insert therefor --from--.

Signed and Sealed this

Twelfth Day of April, 1994

*Attest:*

BRUCE LEHMAN

*Attesting Officer*

*Commissioner of Patents and Trademarks*